(12) United States Patent
Solomon et al.

(10) Patent No.: US 7,127,066 B2
(45) Date of Patent: Oct. 24, 2006

(54) LIMITED USE DVD-VIDEO DISC

(75) Inventors: Merrill Solomon, Potomac, MD (US); Ralph LaBarge, Gambrills, MD (US); Bhaskar Venepalli, Durham, NC (US)

(73) Assignee: Now Showing Entertainment, Inc., Potomac, MD (US)

( * ) Notice: Subject to any disclaimer, the term of this patent is extended or adjusted under 35 U.S.C. 154(b) by 367 days.

(21) Appl. No.: 10/260,973

(22) Filed: Oct. 1, 2002

(65) Prior Publication Data

US 2003/0081521 A1    May 1, 2003

Related U.S. Application Data

(60) Provisional application No. 60/326,446, filed on Oct. 3, 2001.

(51) Int. Cl.
*H04L 9/00*     (2006.01)
(52) U.S. Cl. .................. 380/201; 380/54; 369/47.1
(58) Field of Classification Search .............. 380/201, 380/54, 47.1, 275.1, 286; 369/47.12, 273, 369/47.1, 225.1, 286; 235/487
See application file for complete search history.

(56) References Cited

U.S. PATENT DOCUMENTS

| | | | |
|---|---|---|---|
| 4,961,077 A | 10/1990 | Wilson et al. ............... 369/273 |
| 5,049,428 A | 9/1991 | Kanno et al. | |
| 5,364,708 A | 11/1994 | Tominaga | |
| 5,430,281 A | 7/1995 | Lentz et al. ................. 235/487 |
| 5,436,885 A | 7/1995 | Okumura et al. | |
| 5,489,768 A | 2/1996 | Brownstein et al. ........ 235/487 |
| 5,513,169 A | 4/1996 | Fite et al. | |
| 5,514,440 A | 5/1996 | Gotoh et al. | |
| 5,576,084 A | 11/1996 | Kuroda | |
| 5,604,002 A | 2/1997 | Tsujioka et al. | |
| 5,659,613 A | 8/1997 | Copeland et al. | |
| 5,706,266 A | 1/1998 | Brownstein et al. ........ 235/487 |
| 5,815,484 A * | 9/1998 | Smith et al. ............. 369/275.1 |
| 5,963,536 A | 10/1999 | Vasic et al. .............. 369/47.02 |
| 6,011,772 A * | 1/2000 | Rollhaus et al. ............ 369/286 |
| 6,034,930 A | 3/2000 | Kitahara .................. 369/47.15 |

(Continued)

FOREIGN PATENT DOCUMENTS

EP     0 932 148 A1    7/1999

(Continued)

OTHER PUBLICATIONS

Declaration of Merrill Solomon, filed Jan. 23, 2006.

(Continued)

*Primary Examiner*—Salvatore Cangialosi
(74) *Attorney, Agent, or Firm*—Nixon & Vanderhye P.C.

(57) ABSTRACT

A limited-use Digital Versatile Disc (DVD) includes a storage layer for storing content data and control key data. At least one mark of photosensitive dye is disposed on the disc exterior to the storage layer and over at least a portion of the control key data. In one embodiment, the mark is initially transparent to allow a DVD player to read the control key data. The mark changes from clear to become opaque when it is exposed to DVD reader laser light for a cumulative period of time. This change in the optical property of the mark and the configuration of the control key data prevents further reading of the content data after predetermined reading and playback usage of at least some of the content data is permitted. In another embodiment, the mark is initially opaque to initially prevent the successful reading of the control key data, and permanently changes to transparent when exposed to DVD reader laser light for a cumulative period of time.

70 Claims, 10 Drawing Sheets

U.S. PATENT DOCUMENTS

| | | | | |
|---|---|---|---|---|
| 6,070,799 | A | 6/2000 | Ashe | 369/47.12 |
| 6,104,686 | A | 8/2000 | Whitcher et al. | 369/272.3 |
| 6,338,933 | B1 * | 1/2002 | Lawandy et al. | 369/275.1 |
| 6,343,063 | B1 * | 1/2002 | Rollhaus et al. | 369/286 |
| 6,747,930 | B1 * | 6/2004 | Weldon et al. | 369/47.1 |

FOREIGN PATENT DOCUMENTS

| | | |
|---|---|---|
| WO | WO 98/01533 | 1/1998 |
| WO | WO 98/38510 | 9/1998 |
| WO | WO 00/05582 | 2/2000 |
| WO | WO 00/26677 | 5/2000 |

OTHER PUBLICATIONS

Declaration of Ralph LaBarge, filed Jan. 23, 2006.

* cited by examiner

LIMITED USE DVD-VIDEO DISC

CROSS REFERENCE TO RELATED APPLICATION

This Application claims the benefit of U.S. Provisional Application No. 60/326,446 filed Oct. 3, 2001, the contents of which are incorporated herein by reference.

BACKGROUND OF THE INVENTION

1. Field of the Invention

The present invention relates to a limited-use digital versatile disc (DVD), such as a DVD-video disc that permits only a predetermined number of uses of a video movie. The preferred exemplary embodiment utilizes a dye disposed on the DVD that changes optical properties after being exposed to a DVD reader laser to insure that only a predetermined limited number (e.g., two) use(s) of the DVD are permitted.

2. Description of Related Art

Video rental stores have long rented video cassettes to customers. Video rental stores are now typically renting DVDs to customers in addition to video cassettes. Indeed, the number of DVD rentals is increasing with respect to the number of video cassette rentals and some movies are now even being released on DVDs before being released on video cassettes. The reasons for the increasing number of DVD rentals include, for example, the superior audio and visual quality provided by the DVDs, the faster ability to find a certain scene in the movie, the opportunity to exercise a menu option in some DVDs to view interviews with the actors and/or extra scenes that were cut from the movie, and the elimination of the need to rewind the movie after viewing it. The number of DVD rentals is expected to increase as the number of DVD players owned by customers grows.

Video stores typically rent a DVD for a fixed fee that enables the renter to view the video an unlimited number of times over a prescribed time period. This arrangement is similar to the typical transaction for video cassette rentals. Renters typically are required to pay additional daily rental fees if the video is kept beyond the prescribed initial time period. To accommodate this arrangement, video rental stores must keep detailed renter, accounting and inventory records—as well as check returned DVDs and return them to the rental inventory. The renter, on the other hand must view the rented video soon after acquiring it and then make a prompt return trip to the rental store (to minimize rental fees).

It would be desirable to simply sell non-returnable DVDs on a pay-per-view or limited-use basis. If this could be done, it would no longer be necessary for the video store to check and re-stock inventory returns or to administer complicated renter accounts and/or return/restocking costs. Renter refund costs would also be lowered since damaged DVDs would not be re-rented. In addition, the transaction can now be a sale rather than a rental thus facilitating its occurrence in any store, not just a specialty rental store. The ability to move the transaction from a specialty store to a store the potential customer already visits for other purchases is a significant benefit. Purchasers of limited-use DVDs would also benefit in that the hassles associated with substantially immediate viewing and/or returning of the rented DVDs could be eliminated. In addition, because of the economics of this limited use approach, the current difficulty of maintaining sufficient rental stock of hit movies to fully satisfy consumer demand is avoided.

There have been prior attempts to provide such pay-per-view or limited-use DVDs. For example, a Digital Video Express (DIVX) disc provided a pay-per-view version of a DVD (DIVX was commercially abandoned in 1999). The DIVX discs were purchased by customers at a price that was competitive with the price of a typical video rental and did not have to be returned to the store which sold the DIVX disc. The customers were able to view content of the DIVX disc an unlimited number of times for a prescribed period of time (e.g., 48 hours) after its initial use. The DIVX discs were encoded with computer software that would disable the discs from being played at the expiration of the prescribed period of time. After the initial period expired, customers could order additional viewing time through a connection between the DIVX reader and a telephone line.

Although the DIVX format demonstrates the long felt need of providing a limited-use DVD that does not have to be returned to the video store, the DIVX format had drawbacks that prevented its commercial success. For example, the DIVX system required a telephone line to be connected to the DIVX reader. The DIVX discs could not be viewed on computers having DVD-ROM disc drives. Additionally, DIVX discs could only be viewed by the DIVX reader that initially played the disc, and thus the content of the disc could not be viewed on another DIVX player.

An optical recording medium such as a DVD that prevents unauthorized copying of prerecorded data from the medium is known in the art. For example, U.S. Pat. No. 5,963,536—Vasic et al. (1999) discloses an optical recording medium comprising a prerecorded area for storing user data and a copy count area. The copy count area comprises a photosensitive layer that includes a material that permanently changes when exposed to a laser light from a conventional optical recording medium reader. The change in the optical properties of the photosensitive layer produces changes in the reflected laser light beam that are detectable during a subsequent reading by the reader.

Specifically, the photosensitive layer disclosed by Vasic et al. forms at least one ring in the copy count area, each ring corresponding to one authorized copy of the user data. After the rings have changed, a detectable change in the reflected light of the reader while reading the copy count information will result in a high user data bit error rate and a high tracking error rate. This high user data bit error rate and the high tracking error rate will inhibit the reader from reading the medium and copying the user data from the medium. The high user data bit error rate and the high tracking error rate resulting from the change in the optical properties of the photosensitive layer thus acts as an indicator to the reader that an authorized copy of the medium has already been made or that data from the medium has already been displayed.

Vasic et al. discloses another embodiment in which a photosensitive layer overlays a prerecorded area. The photosensitive layer is optically changed after one reading of the prerecorded area and renders the medium invalid for further reading or copying.

Other prior known attempts to provide an optical recordable device include the following:

U.S. Pat. No. 6,104,686-Whitcher et al. (2000)

Published European Patent Application No. 09/32148-Pan et al. (1999).

Whitcher et al. discloses an optical recording disc that includes a layer of laser markable material such as a "write once" phase change material. The optical properties of the laser markable material are altered to cause the reflectivity of the material to be altered. It can thus be determined through the markable material whether the optical recording disc has been previously accessed.

Pan discloses an optical recordable device having a markable phase-change layer formed on a small portion of a transparent layer. The markable phase-change layer can change from an amorphous state to a crystalline state during heating by a laser read beam.

Various other types of optical storage mediums have been employed. For example, see:

U.S. Pat. No. 5,706,266-Brownstein et al. (1998)
U.S. Pat. No. 5,489,768-Brownstein et al. (1996)
U.S. Pat. No. 5,430,281-Lentz et al. (1995)
U.S. Pat. No. 4,961,077-Wilson et al. (1990)
U.S. Pat. No. 6,070,799-Ashe (2000)
U.S. Pat. No. 6,034,930-Kitahara (2000)

Although these prior art examples demonstrate a long-felt need in the art for a limited-use DVD, at least some of them involve relatively complex structures which must be produced through complicated manufacturing processes or need special readers to operate the DVD properly.

Accordingly, there remains a need for an improved solution to this long-standing problem. The DVD of the present invention fills this need by employing a construction that permits only the limited use of a DVD and can be viewed using any standard DVD reader.

Even though a standard DVD reader has a relatively powerful microprocessor incorporated in it, there has conventionally not been any way for an entity other than the manufacturer of the DVD reader (during manufacture) to access its power and manipulate its capabilities. It has therefore been previously thought to be impossible, after a standard DVD reader was manufactured, to externally provide the DVD reader with a decision-making capability. Accordingly, their remains a need in the art to enable a standard DVD reader to have an externally-provided decision making capability. That is, there remains a need to create branching points for the operation of a DVD reader where one had not existed heretofore.

SUMMARY OF THE INVENTION

This invention provides an improved limited-use DVD. Exemplary embodiments provide, for example, usage of the DVD for at least a predetermined number of uses (e.g., two). Further, each "use" may comprise a substantially unfettered use. For example, a use may include the ability to read and play the entire content data of the DVD an unlimited number of times and not ending until the viewer stops play of the DVD, ejects the DVD from the DVD reader, or turns off the power of the DVD reader.

At least one of the exemplary embodiments of the invention include a DVD which externally superimposes a decision-making capability to a standard DVD reader. This decision-making capability superimposed by the DVD is accomplished by printing a photosensitive dye onto a standard DVD whose properties are such that before it is exposed to a laser of a DVD reader, the data underneath the dye cannot be accurately read by the reader, but that after the dye is exposed to the laser, the data can be accurately read. In at least some of the embodiments of the present invention, the dye is placed in a small number (e.g., two or three) of precisely identified locations over predetermined specific data sectors on the disc. When the disc is first read by the reader, the dye would make the DVD reader determine that there was an error on the disc in that data sector. The DVD reader would then, via control logic stored on the disc using standard authoring commands (but used in a manner never intended) be instructed to take one course of action (e.g., to read content data also stored on the disc). However, after the dye is re-read by the DVD reader, and hence the error on the disc in that data sector can no longer be detected, the player is then instructed via the control logic to take another course of action (e.g., prevent the content data stored on the disc from being further read). Accordingly, a branching point at which a decision is made has in essence been created.

Imbedded in the programming of every DVD disc is an error correction algorithm such as the Reed-Solomon error correction algorithm capability. The error correction algorithm is utilized in every disc so that minor scratches or blemishes that occur during the normal handling of a disc will not cause the disc to become unreadable by creating errors in the data stream. An exemplary embodiment of the present invention effectively interfaces with the error correction algorithm by providing a dye spot of an appropriate size and composition to overcome the error correction at appropriate times. Specifically, the dye applied to the DVD disc in at least one exemplary embodiment of the invention creates errors that are large enough so that the Reed-Solomon error correction algorithm cannot automatically the errors, but small enough so that the DVD reader does not lock-up due to the reader determining that the DVD disc is overwhelmingly scratched or blemished.

Complicating the task of effectively interfacing with the error correction algorithm is the fact that there is no standard for interpreting an error correction algorithm such as the Reed-Solomon error correction code. Every manufacturer is therefore free to interpreting the error correction data stream in whatever manner programmed. By finding the lowest common denominator for this delicate balance, an exemplary embodiment of the present invention is capable of working in all (or just about all) types of commercially available DVD readers.

In at least one embodiment of the invention, it is not the mere presence or absence of the dye, subsequent errors or error corrections in the data stream that causes the DVD reader to take different courses of action, but rather a change in the state of the dye from opaque to clear (or vice versa) and the data stream having errors or not having errors that causes the branching decision points to exist.

The exemplary embodiments described in more detail below, include one or more novel features. Some of the permutations and/or combinations of these novel features may include, for example:

(1) an infrared photosensitive dye disposed on a read surface of a DVD, the optical state of the dye effectively serving as an indicator of whether protected content data has been read and played to thus provide a rudimentary form of memory;

(2) use of discs that are fully compliant with the DVD-video specification published by the DVD Forum and that have been designed to detect the presence or absence of an infrared photosensitive dye;

(3) multiple control keys which enable protected content data to be played a corresponding number of multiple times;

(4) unlimited playback and usage of protected content data once a control key data has been accepted until the user ejects the DVD, turns the power to the DVD reader off or selects a stop command on the DVD reader;

(5) use of a multi-part or multi-instant control key(s) and multiple dye marks to ease manufacturing requirements for high precision dyed printing; and/or (6) use of control logic stored on the DVD which prevents protected content data from being read based on changes in photosensitive dye properties, thus providing enhanced piracy protection.

In an exemplary embodiment, the limited-use DVD comprises a storage track area that stores protected content data and control key data. The protected content data comprises, for example, data reflecting movie content. At least one mark of photosensitive dye is disposed on the disc exterior to the storage track area over at least a portion of the control key to allow or prevent successful reading of the control key data by a DVD reader. Control logic is also stored by the DVD disc. The control logic may be configured with control key data and the mark of photosensitive dye to prevent further reading and hence playback of protected content data after a predetermined number of reading and playback usage(s) of protected content data.

The control logic may comprise clear key data logic which enables predetermined reading and playback usage of the protected content data once the control key data is read by the DVD reader. Alternatively, the control logic may comprise hidden key data logic which prevents further reading and hence playback of the protected content data once the control key data is read by the DVD reader. In yet other exemplary embodiments, the control logic may comprise change key data logic which enables the predetermined reading and playback usage of the protected content data if successive attempted reads of the control key data yield different results, and prevents further reading and playback usage of the content data if successive attempted reads of the of the control key data yield the same results.

In some exemplary embodiments, the mark of photosensitive dye is initially transparent (i.e., transparent to the reading laser light) to allow the control key data to initially be read by the DVD reader and then permanently changes to become opaque (with respect to the reading laser light) when further exposed to light of the DVD reader laser for at least a predetermined cumulative period of time. Alternatively, the mark of photosensitive dye is initially opaque to prevent the control key data from initially being read by the DVD reader and then permanently changes to become transparent when further exposed to light of the DVD reader laser for at least a predetermined cumulative period of time. The exposure to the laser needed to change an optical property of the mark (i.e., from transparent to opaque or from opaque to transparent) is incrementally accomplished, for example, by repeatedly reading (or at least attempting to read) the control key data until a change in the mark occurs (or does not occur when otherwise expected).

In embodiments including a mark that is initially transparent (i.e., transparent to the laser reading light), the control logic may, for example, comprise clear key data logic. The control key data is read through the initially transparent mark to enable predetermined reading and playback usage, via clear key data logic, of protected content data. After the mark is permanently changed to become opaque due to exposure to the DVD reader laser, the control key data is prevented from being read by the now opaque mark thereby preventing further reading of the content data via the clear key logic.

The control logic may, alternatively, comprise change key data logic so that a first of successive reads of the control key yields a first value based on the successful reading of the control key through the mark. After the mark is permanently changed to become opaque through exposure to the DVD reader laser, a second of the successive reads yields a second (different) value based on the unsuccessful reading of the control key data. Since the first two successive reads yield different results, the control key data will initially enable the predetermined reading and playback usage of the content data via the change key data logic. After the mark permanently changes from clear to become opaque, successive attempts (e.g., third and fourth attempts) to read the control key data will yield the same second value based on the unsuccessful reading of the control key data. Since successive reads now yield the same results, the control key data will prevent further reading of protected content data via the change key data logic.

In embodiments including a mark that is initially opaque, the control logic may, for example, comprise hidden key data logic. The control key data is initially prevented from being read by the opaque mark to enable predetermined reading and playback usage of the protected content data via the hidden key data logic. After the mark is permanently changed to become transparent because of exposure to the DVD reader laser, the control key data can be read through the now transparent mark to prevent further reading of the protected content data via the hidden key data logic.

The control logic may, alternatively, comprise change key data logic so that a first of successive reads of the control key data yields a first value based on the unsuccessful reading of the control key data. After the mark is permanently changed to become transparent through exposure to the laser of the DVD reader, a second of the successive reads of the control key data yields a second (different) value based on the successful reading of the change key data through the now transparent mark. Since the first two successive reads yield different results, the change key data logic will initially enable predetermined reading and playback usage of the protected content data. After the mark permanently changes to become transparent, successive attempts (e.g., third and fourth attempts) to read the control key data will yield the same second value based on the successful readings of the control key data through the now transparent mark. Since successive reads now yield the same results, the change key data logic will prevent further reading of the content data.

The storage layer may comprise a single spiral track with the protected content data being stored within some turns of the spiral and the control key data being stored within at least one other turn of the spiral. Non-protected content data (e.g., non-movie data) may also be stored in one or more turns of the storage layer. In some embodiments, the control key data preferably comprises a plurality of parts or instances that are distributed within a plurality of consecutive turns of the spiral. At least one mark is disposed (e.g., printed) in a position on a read surface of the disc located over at least one part or instance of the control key data.

In some exemplary embodiments, a plurality of marks are disposed on the read surface of the disc. These marks may be disposed, for example, at substantially a single radius of the disc (covering one or a few contiguous turns of the spiral). By disposing a plurality of marks on the disc, disposing at least one of the marks over a portion of control key data (e.g., over at least one part or instance of the control key data) can be accomplished with a high degree of reliability. This will insure that the control key data and the marks have the necessary configuration to prevent further reading of the protected content data after a predetermined number of reading and playback usages of the protected content data. The optical property of only one of the marks disposed over a portion of the control key data needs be changed to prevent further reading and playback of protected content data.

In some exemplary embodiments, padding data is stored in groups of consecutive turns of the spiral that sandwich the consecutive turns (or single turn) storing control key data.

The turns of the spiral storing padding data helps to insure that the mark or plurality of marks disposed on the disc does not cover any of the spiral turns storing protected content data. The width of the mark(s) may thus exceed the width of the group of consecutive turns storing the control key data to ease requirements for high precision printing of the mark(s) and to insure that the mark(s) is (are) disposed over (i.e., in registration with) at least a portion of the control key data without covering any turns storing protected content data. The marks may have a shape in the form of, for example, small arcs, dots, rectangles or squares.

The storage layer may also store a second (or further) control key(s) (i.e., further data representing further control keys). A second mark or second plurality of marks is disposed on the read surface of the disc over at least a portion of the second control key data. Like the first mentioned control key data, the second control key data may, for example, comprise a plurality of parts or instances that are distributed over and stored within a plurality of consecutive turns of spiral track. The first and second control keys may control the number of predetermined uses of the disc. For example, by storing a second control key, the number of uses of the disc can be limited to two. The number of control key(s), in some embodiments, will thus be equal to the number of permitted reading and playback use(s) of the protected content data (i.e., the number before protected content data is prevented from being further read).

In some embodiments having a second control key data, protected content data is stored in an area of the storage layer that is between storage areas respectively storing first and second control key data. Specifically, the turns of the spiral track storing protected content data are arranged between a group of consecutive turns storing first control key data (e.g., storing all parts or instances of the first control key data) and a group of consecutive turns storing second control key data (e.g., storing all parts or instances of second control key data). Reading of the protected content data can therefore be smoothly performed without interruption. Groups of consecutive turns respectively storing the first control key data and the second control key data may each be surrounded on both sides by turns storing padding data. Mark(s) printed over the first control key and mark(s) disposed over the second control key data can thus more easily be prevented from being erroneously disposed over turns storing protected content data.

It should also be noted that utilizing control key(s) and mark(s) of photosensitive dye of the present invention not only gives the content owner an ability to limit protected content viewing by a purchaser, it also gives the purchaser a very user-friendly way to view the contents so that there is never a point in a movie at which the viewer cannot watch some favorite scene over and over again. In essence, in one exemplary embodiment, the viewer could watch and re-watch the movie forever as long as the viewer does not press the stop button of the DVD reader, eject the DVD or turn off the DVD reader's power.

BRIEF DESCRIPTION OF THE DRAWINGS

These and other objects and advantages of this invention will become apparent from the following more detailed description of the exemplary embodiments taken in conjunction with the accompanying drawings in which.

DETAILED DESCRIPTION OF EXEMPLARY EMBODIMENTS

Figure 1A:
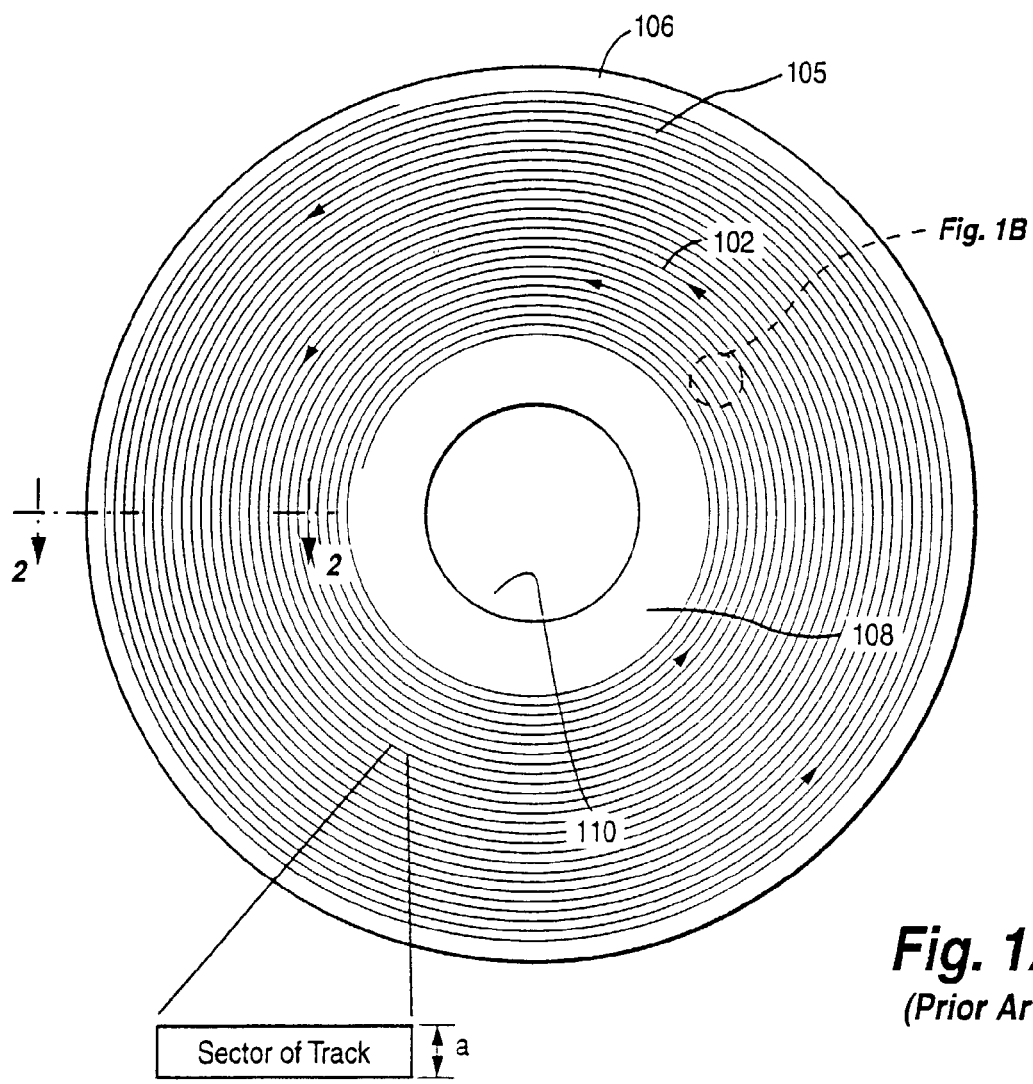
FIG. 1A is a bottom view, with a part broken away, of a conventional DVD.
Figure 1B:
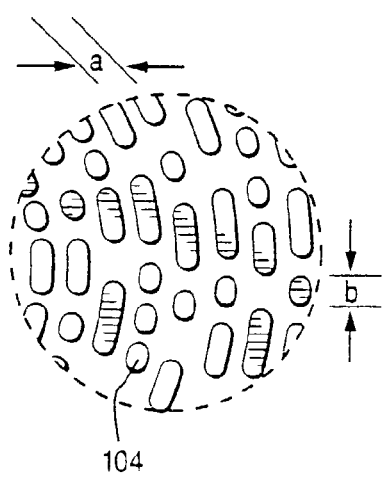
FIG. 1B is a detailed view of the part broken away from FIG. 1A.

FIGS. 1A-1B and 2 illustrate a conventional DVD including two distinct circular pieces of molded plastic 100, 150 that are bonded or glued together by an adhesive layer 170. Starting from the center of the disc, the disc includes a center hole 110 for mounting the disc into a DVD reader, an unused center area 108, a data area 105 for storing user data and error correction data, and an unused outside area 106. The data area 105 comprises one or more storage layers, each storage layer having a single track 102 that spirals around the disc. The spirals of each track contain microscopic bumps (or pits) for encoding recorded data. Each storage layer also includes a reflective layer 120 arranged over the track, including the bumps contained in the track, to reflect a laser light from the DVD reader so that the data recorded in the track can be read.

The total diameter of a typical currently used disc is either 12 cm (as shown in FIG. 1A) or 8 cm and the total thickness of the disc is typically 1.2 mm. The inner and outer radii of the data area 105 for a typical 12 cm disc is 24 cm and 58 cm, respectively, and thus the size of the data area 105 for a 12 cm disc is approximately 8759 mm$^2$. The area of the unused center area and the center hole of a 12 cm disc is 1809 mm$^2$ and the area of the unused outside area is 741mm$^2$. The width (labeled "a" in FIG. 1B) of the track that spirals around the disc is typically 740 nm and the minimum length (labeled "b" in FIG. 1B) of a bump in the track is typically 400 nm. These and other physical parameters of conventional currently available DVDs are summarized in Table I.

TABLE I

DVD Parameters

|  | 1 Storage Layer | 2 Storage Layers |
|---|---|---|
| User Data Capacity | | |
| 12 cm Disc | 4.7 billion bytes | 8.54 billion bytes |
| 8 cm Disc | 1.46 billion bytes | 2.66 billion bytes |
| Numerical Aperture | 0.60 | 0.60 |
| Data Bit Length | 0.267 μm | 0.293 μm |
| Channel Bit Length | 0.133 μm | 0.147 μm |
| Minimum Bit Length | 0.400 μm | 0.440 μm |
| Maximum Bit Length | 1.86 μm | 2.054 μm |
| Disc Diameter | | |
| 12 cm Disc | 120 mm | 120 mm |
| 8 cm Disc | 80 mm | 80 mm |

TABLE I-continued

DVD Parameters

|  | 1 Storage Layer | 2 Storage Layers |
|---|---|---|
| Disc Thickness | 0.60 × 2 | 0.60 × 2 mm |
| Disc Center Hole | 15.0 mm | 15.0 mm |
| Data Area Inner Radius | 24.0 mm | 24.0 mm |
| Data Area Outer Radius |  |  |
| 12 cm | 58.0 mm | 58.0 mm |
| 8 cm | 38.0 mm | 38.0 mm |
| User Data per Sector | 2048 Bytes | 2048 Bytes |
| Number of Sectors in 12 cm Disc | 2,294,912 | 2,084,960 |
| Average Number of Sectors per Spiral | 49.9 | 49.9 |
| Average Data Amount per Track | 102,400 bytes | 102,400 bytes |
| Rotation Speed | 9–10 rev/sec | 9–10 rev/sec |
| Laser Wavelength from DVD Reader | 600/635 nm | 600/635 nm |

Figure 2A:
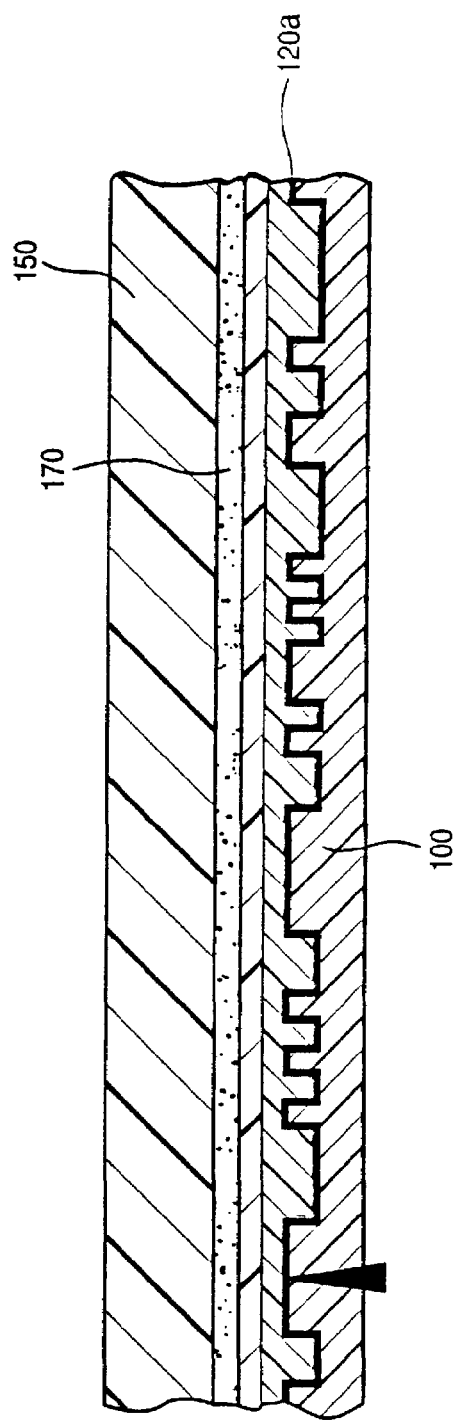
FIGS. 2A-2D are exemplary cross-sectional views of a conventional DVD which are not necessarily drawn to scale.
Figure 2B:
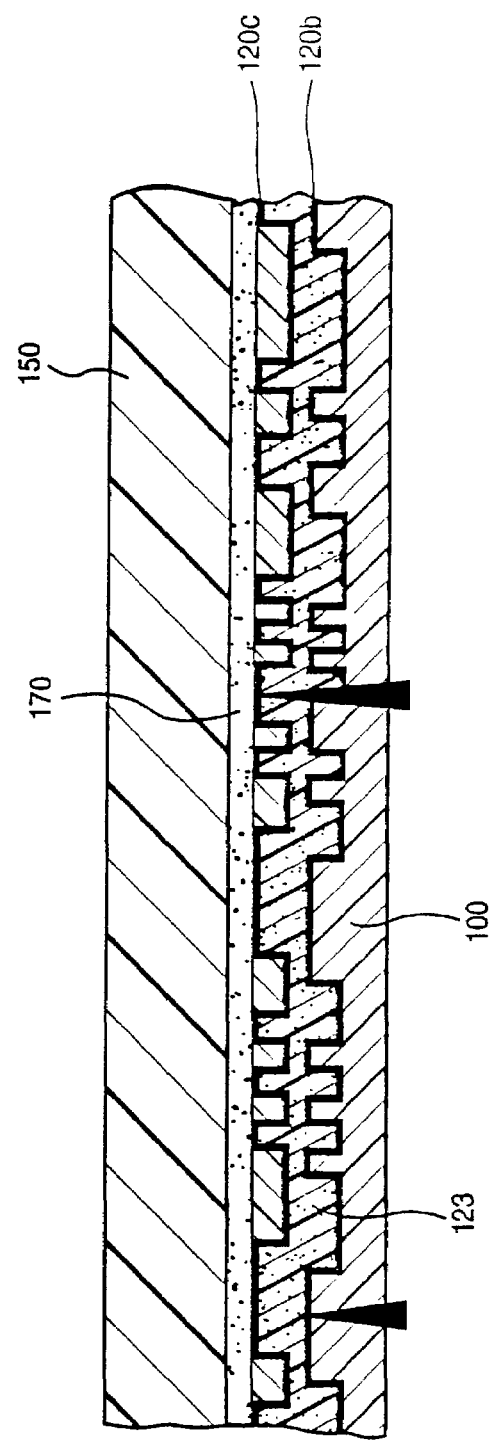
Figure 2C:
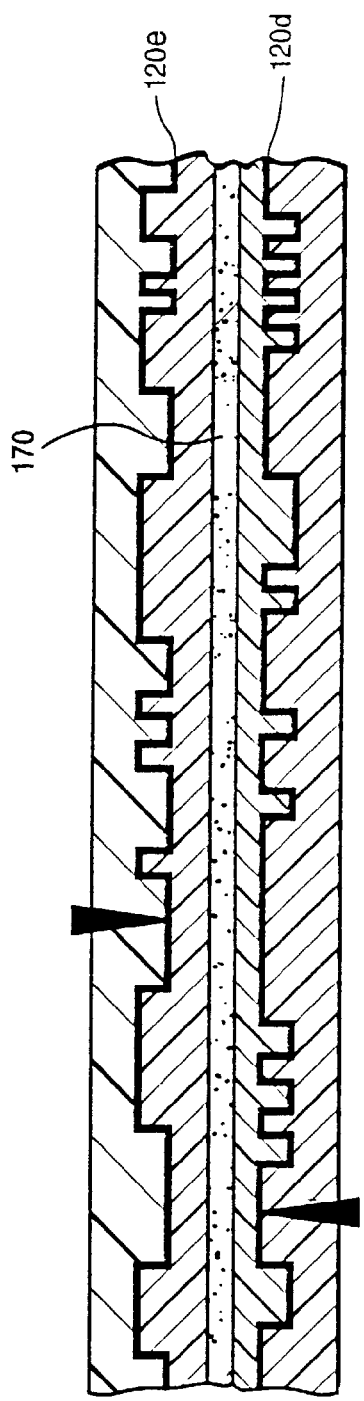
Figure 2D:
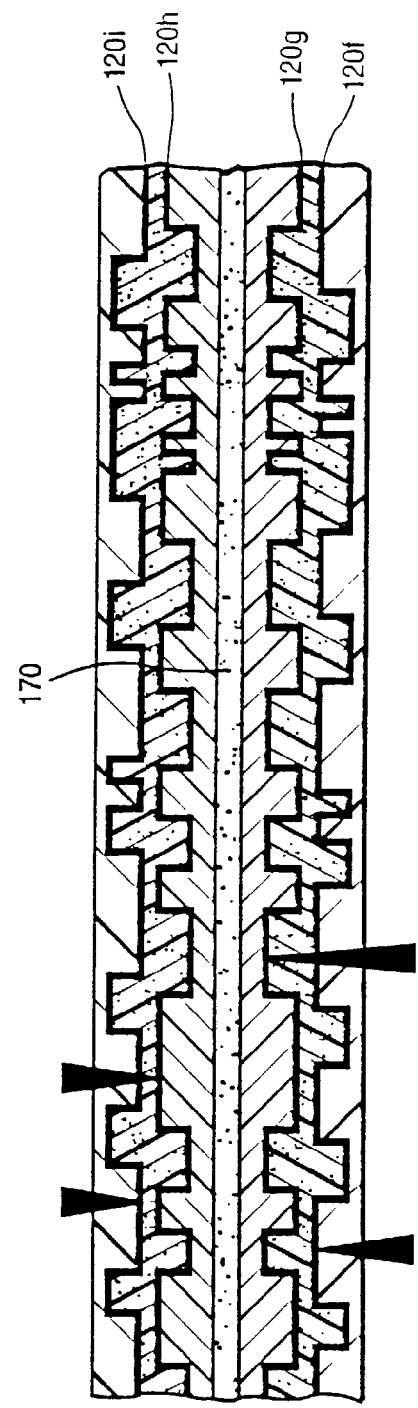

FIGS. 2A-2D respectively show in detail (but not to scale) a cross section of the following conventional configurations of the data area 105: single sided, single storage layer (FIG. 2A), single sided, double storage layer (FIG. 2B), double sided, single storage layer (FIG. 2C) and double sided, double storage layer (FIG. 2D). The configurations illustrated in FIGS. 2A, 2B, 2C and 2D are referred to as DVD-5, DVD-9, DVD-10 and DVD-18, respectively. A DVD that has three recording layers, two on one side and one on the other, is also known in the art and is commonly referred to as DVD-14.

As illustrated in FIG. 2A, the DVD-5 disc includes only a single storage layer and thus only a single reflective layer 120a. The plastic layer 150 forming the top side of the DVD is essentially unused in the DVD-5 disc. A label identifying the DVD can therefore be printed on the layer 150 without interfering with the DVD reader's laser light which is represented by the triangle pointing through the plastic layer 100 forming the bottom layer of the disc. The laser light is transmitted through the plastic layer 100 and reflected by the reflective layer 120a.

As illustrated in FIG. 2B, the DVD-9 disc includes two storage layers and hence two reflective layers 120b (partially reflective), 120c (totally reflective). A transparent layer 123 separates the two storage layers on the bottom side of the DVD-9 disc. The laser from the DVD reader can focus on either of the storage layers to read the data encoded in either of the storage layers. If the laser light from the DVD reader focuses on the storage layer having semi-reflective layer 120c (i.e., the top storage layer illustrated in FIG. 2B), the transparent layer 123 and reflective layer 120b will allow the laser light to pass through it so that the data in that upper storage layer can be read. Like the DVD-5 disc, the top side of the DVD-9 disc is essentially unused.

As illustrated in FIGS. 2C-2D, the DVD-10 and DVD-18 discs are each double sided discs, meaning that at least one storage layer is arranged on each side of the disc. Specifically, a storage layer having a reflective layer 120d is arranged on one side of the DVD-10 disc illustrated in FIG. 2C and another storage layer having a reflective layer 120e is arranged on the other side. The DVD-18 disc illustrated in FIG. 2D includes two storage layers respectively having semi-reflective layer 120f, reflective layer 120g on one side of the disc and two storage layers respectively having reflective layer 120h and semi-reflective layer, 120i on the other side. Since both sides of the DVD-10 or DVD-18 disc are used for reading, any printed label on the disc must be arranged over an unused area 106 and/or 108.

Typical data storage capacities for the currently available DVD-5, DVD-9, DVD-10, DVD-14 and DVD-18 discs are provided in Table II.

TABLE II

DVD Storage Capacities

|  |  | DVD-5 | DVD-9 | DVD-10 | DVD-14 | DVD-18 |
|---|---|---|---|---|---|---|
| User Data Capacity (Gbytes)* | 12 cm disc | 4.38 | 7.95 | 8.75 | 12.3 | 15.9 |
|  | 8 cm disc | 1.36 | 2.48 | 2.72 | 3.84 | 4.96 |

*Storage capacities are listed in computer Gbytes

Figure 3:
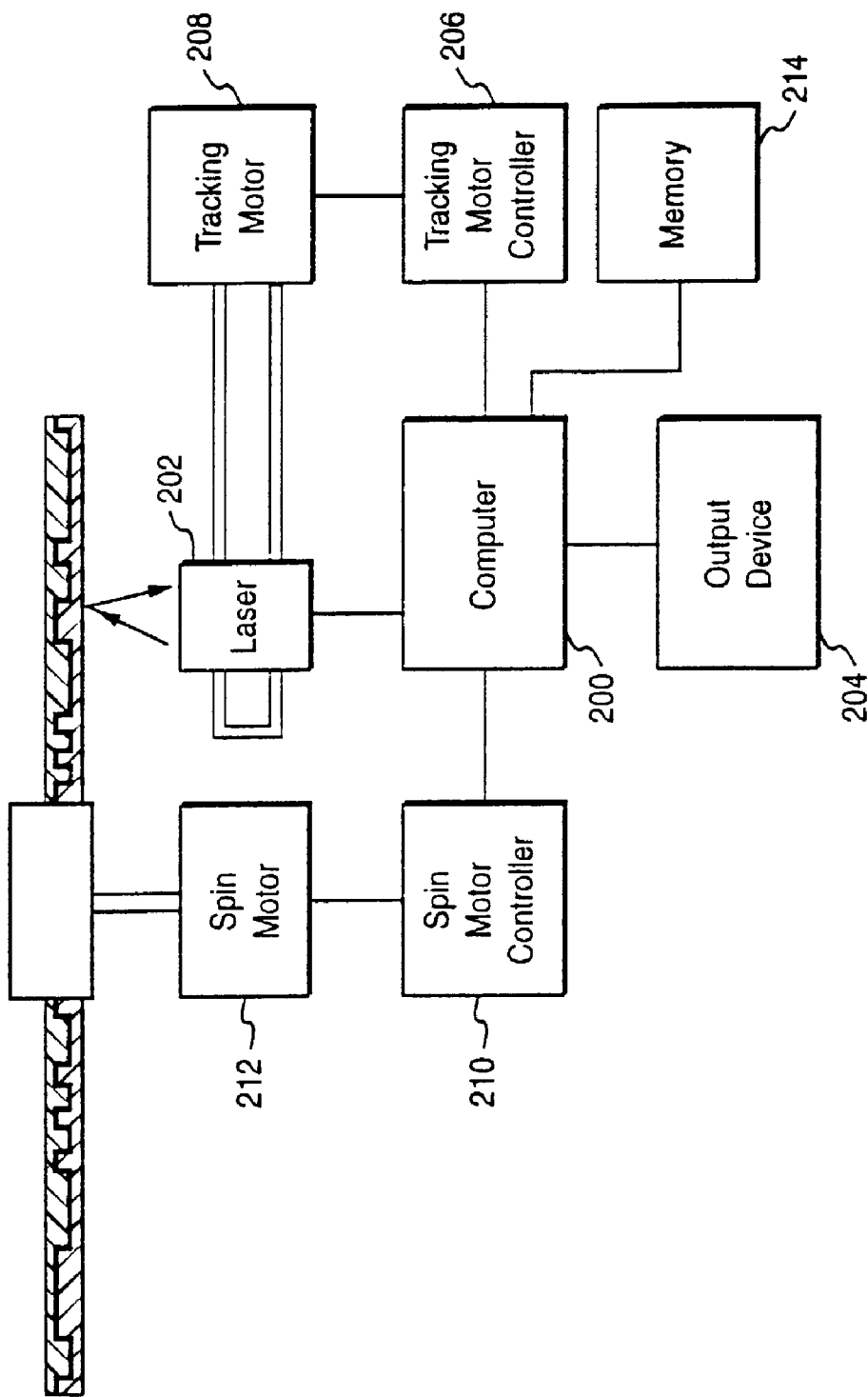
FIG. 3 is a block diagram of a conventional DVD reader.

FIG. 3 generally depicts some typical parts of a conventional DVD reader that can be used to read any of the conventional DVDs discussed above in conjunction with FIGS. 1A-1B and 2. As illustrated in FIG. 3, a conventional DVD reader may include a computer 200, a laser 202, an output device 204, a tracking motor controller 206, a tracking motor 208, a spin motor controller 210, a spin motor 212 and a memory 214.

The tracking motor 208 is capable of positioning laser 202 at various radii of the disc under control of tracking motor controller 206 and computer 200. By controlling the position of laser 202, light from laser 202 can be focused on a specific spiral turn of the storage layer to read data encoded by bumps in that spiral turn. For example, tracking motor 208 can reposition laser 202 so that a reading laser light beam can continuously follow the spiral track of a storage layer.

Spin motor 212 spins the DVD under control of spin motor controller 210 and computer 200. Spin motor 212 rotates the disc at a variable angular speed between approximately 3-10 revolutions per second. As laser 202 is repositioned by tracking motor 208 in a radially outward direction from the center of the disc, spin motor 212 will slow the angular speed of the rotating disc under control of spin motor controller 210. This will enable data from the DVD to be read a constant rate since the linear speed of bumps passing by the reading laser light beam will be higher for a given angular speed when the laser is positioned at a greater radii of the DVD.

Light from a typical reading laser 202 may have a wavelength between 635-650 nm and is capable of focusing on a specific spiral turn of any one storage layer on a side of the disc being read. Specifically, laser 202 includes a lens and motor system (not shown) to focus on a specific spiral turn. As discussed in conjunction with FIG. 2B, light from laser 202 will pass through the closest storage layer of the disc to read data stored in a storage layer that is further away (i.e., closer to the center of the disc).

Once laser 202 is properly focused on an appropriate spiral turn of a storage layer, reading light will reflect off the associated reflective layer covering bumps which encode recorded data. The bumps control and change the reflection point of the reading laser light causing corresponding changes in the amount of reflected light. These changes in reflected light are detected by a co-located optical pick-up device (also represented by block 202) which sends corresponding binary-valued signals to computer 200. Computer 200, in turn, provides processed signals to an output device 204, such as a television monitor, so that otherwise utilized contents may be viewed.

Exemplary structure for effecting limited-use of a DVD according to the present invention is readily adaptable to conventional DVDs such as those discussed above. Typical conventional DVD readers, such as the one generally described above, may be used to read a DVD according to the present invention.

Figure 4A:
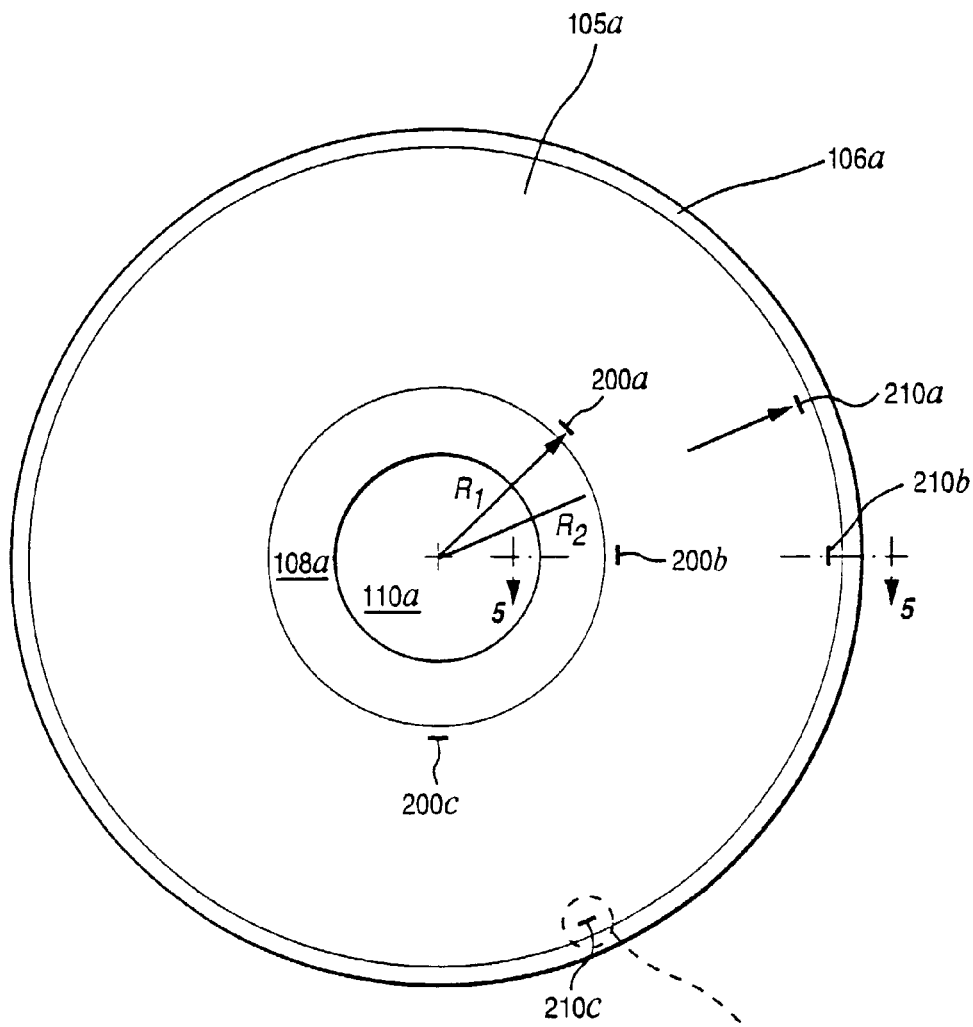
FIG. 4A is a bottom view, with a part broken away, of a first exemplary embodiment of a DVD of the present invention.
Figure 4B:
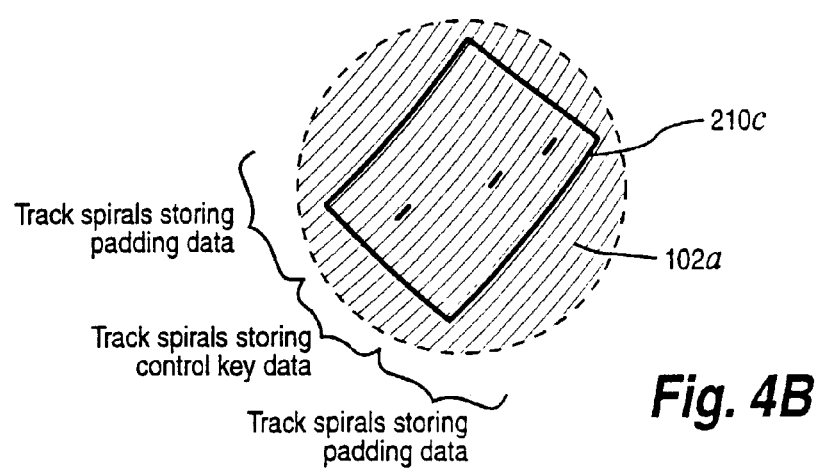
FIG. 4B is a detailed view of the part broken away from FIG. 4A.
Figure 5:
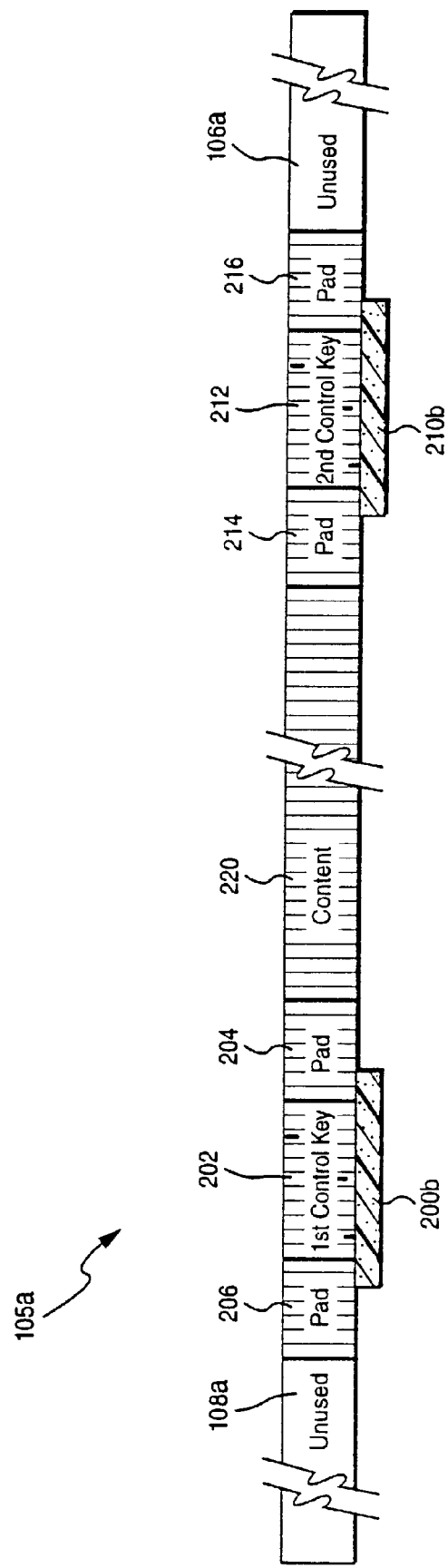
FIG. 5 is a cross-sectional view of the disc illustrated in FIG. 4A.

FIGS. 4A, 4B and 5 illustrate a DVD constructed in accordance with a first exemplary embodiment of the present invention. Like conventional DVDs, the DVD of the present invention includes a center hole 110a for mounting the disc into a DVD reader, unused center area 108a, a data area 105a for storing user data and error correction data, and an unused outside area 106a. The data area 105a comprises one or more storage layers, each storage layer having a single continuous track 102a that spirals around the disc with its associated reflective layer for reflecting light from the DVD reader. One or more storage layers may be arranged on each of the two disc sides. Each spiral turn of track 102a contains the usual microscopic bumps (or pits) for digitally encoding recorded data.

However, the DVD of the present invention also includes at least one mark disposed (e.g., printed) at a predetermined location (in association with underlying recorded control data) on a surface (e.g., the outermost surface or an intermediate surface covered by an outer layer that does not interfere with desired changes in the mark(s)) of one or both sides of the disc. The surface on which the at least one mark is disposed on a surface that is exterior to the storage layer(s). For example, FIG. 4A illustrates one exemplary embodiment which includes a first set of marks 200a-210c printed at a first radius R1 from the center of the disc and a second set of marks 210a-210c printed at a second radius $R_2$ from the center of the disc. Each of the marks 200a-210c, 210a-210c includes a chemical photosensitive dye that changes its optical properties when exposed to laser light from a DVD reader for a certain cumulative amount of time (e.g., a cumulative amount of time that is incrementally reached). Specifically, each of the marks 200a-210c, 210a-210c will change (a) from transparent to become opaque or (b) from opaque to become transparent when exposed to an approximately 1 milliwatt infrared laser having a wavelength of 635-650 nm for a certain cumulative amount of time. The DVD reader that provides laser light needed to change optical properties of marks 200a-210c, 210a-210c may be a conventional DVD reader. If the dye of a mark currently has a transparent optical property, the laser light from the DVD reader may be successfully transmitted through the mark. If, however, the dye of a mark has an "opaque" optical property, laser light from the DVD reader will not be successfully transmitted through the mark.

In one exemplary embodiment, the marks 200a-210c, 210a-210c on the disc are all initially transparent at the time the user first places the disc into the DVD reader. After being exposed to DVD reader laser light for a certain cumulative amount of time, the marks permanently change to become opaque, although both sets of marks 200a-210c and 210a-210c may not be exposed to laser light at the same instants of time. In an alternative exemplary embodiment, marks 200a-210c, 210a-210c are all initially opaque when the user first places the disc into a DVD reader. However, after being exposed to DVD reader laser light for a certain cumulative amount of time, the marks permanently become transparent, although both sets of marks 200a-210c and 210a-210c may not be exposed to laser light at the same instants of time.

Photosensitive dyes are needed to form marks that permanently change from transparent to become opaque (or at least provide a change in reflectivity that is detectable by the reader) when exposed to DVD reader laser light for a certain cumulative amount of time. Alternatively, photosensitive dyes are needed to form marks that permanently change from opaque to become transparent (or at least provide a change in reflectivity that is detectable by the DVD reader) when exposed to DVD reader laser light for a certain cumulative amount of time. Exemplary dyes forming the marks which change from opaque to become clear include the following: Phthalocyanine and naphtholocyanine dyes—metallated and non-metallated and cyanine dyes of the type—IR-125 including, for example:

(1) Aluminumphthalocyanine Chloride (Molecular formula: $(C_{32}H_{16}N_8AlCl)$). The variations of this dye may include, for example, CxHyNzMX, where x=18-45, y=8-40, z=8-16; M=Al, Zn, Cu or no metal, X=halogen, OH or nothing); and (2) Metal free phthalocyanine with ethylhexyloxycarbonylphenoxy substituents.

The above dyes were dissolved in hydrocarbon and alcohol based solvents with weight ranges of 0.2-2.5% by weight. Solvents used may be, for example, hexane, cyclohexane, toluene, MEK, methanol, ethanol, isopropanol.

Typically the chosen dye must be applied (e.g., during a printing process) by use with an admixed transfer agent which binds the dye to the disc surface and which has stable optical properties that do not interfere with the desired changes in optical properties of the dye. For example, if a transparent state of the dye is to be effective, then the transfer agent must also be transparent (at least at the appropriate time). Alternatively, a layer having stable optical properties that do not interfere with the desired changes in the dye's optical properties may be applied over the marks (so that the marks are between a storage layer and the layer having stable optical properties) to insure that the marks are properly held to the substrate of the DVD.

Figure 7:
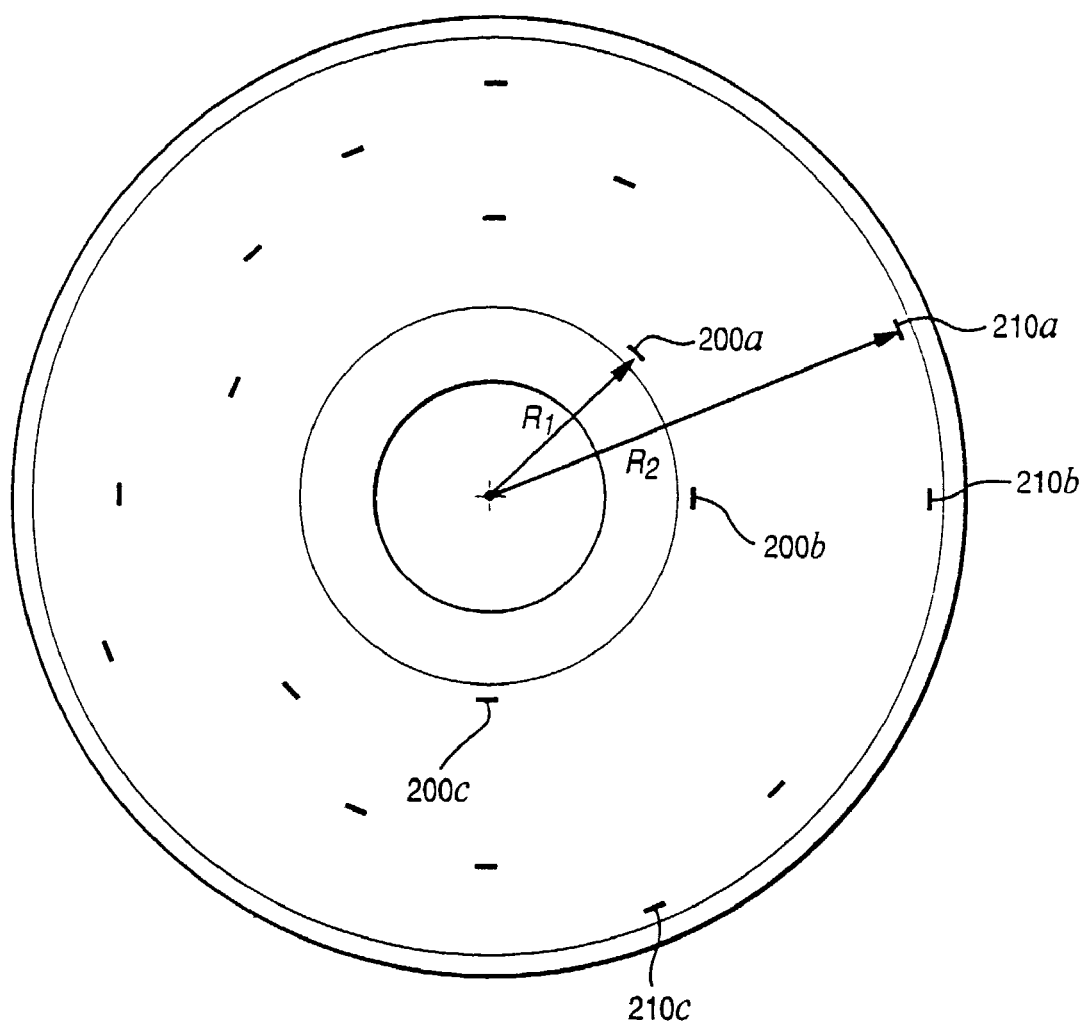
FIG. 7 is a bottom view of yet another exemplary embodiment of a DVD of the present invention.

The exemplary embodiment illustrated in FIG. 4A includes three marks 200a-210c printed at radius $R_1$ and three marks 210a-210c printed at radius $R_2$. The number of marks printed at a given radius can be higher or lower, as long as at least one of the marks is printed over at least a portion of a respectively associated control key as will be discussed in more detail below. The number of radii at which marks are printed may be higher or lower than the two radii illustrated in the exemplary embodiment of FIG. 4A. The number of radii at which marks are printed may be equal to the number of control keys that are stored in the data area 105a of the disc. For example, FIG. 7 discloses an alternative embodiment in accordance with the present invention that includes six sets of marks (including marks 200a-210c, 210a-210c) printed at six different radii over six corresponding control keys (not shown).

Of course it is also possible that more than one control key can be recorded along one spiral turn. However, if a given control key is repeatedly recorded along a predetermined whole spiral turn, then printing a sufficient number of marks at the corresponding radius distributed along that track will surely overlie at least a portion of at least one recorded instance of the control key. In this way, problems in precision mark printing in registration with underlying recorded control key data can be reduced.

Figure 6:
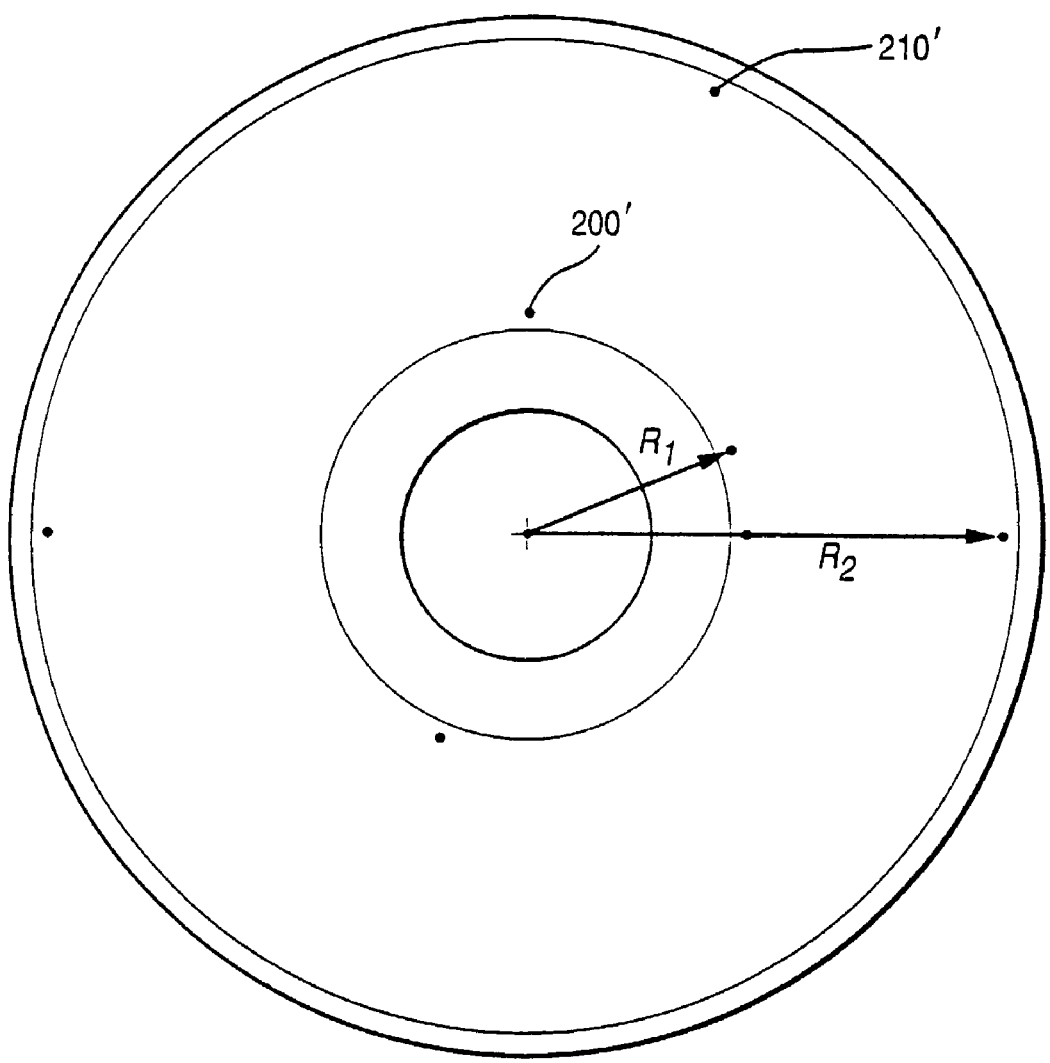
FIG. 6 is a bottom view of another exemplary embodiment of a DVD of the present invention.

Each of the marks 200a-210c, 210a-210c illustrated in FIG. 4A may be in the shape of an arc (see also FIG. 4B). This shape may alternatively be in the form of a dot as shown by dots 200', 210' in the alternative exemplary embodiment illustrated in FIG. 6. The shape of the marks may alternatively be in the form of a square or rectangle. The size of the marks 200a-210c, 210a-210c must be large enough to cover at least a portion of at least one instance of the associated control key data and to overcome the automatic error correction capabilities (provided by an error correction algorithm such as the Reed-Solomon error correction algorithm) of the DVD. However, the marks 200a-210c, 210a-210c need to be small enough so that the DVD reader does not entirely "lock up" and stop operating upon the attempted reading of obscured control key data. Furthermore the number of marks needs to be small enough so that the DVD reader does not entirely "lock-up."

The marks may be printed on the disc after manufacturing of the disc by a conventional process has been completed. Specifically, the manufacturing of the disc may be completed to a point so that the storage layer(s) properly stores all of the intended content data, control key data and control logic before the marks are printed on the disc. If the manufacturing of the disc were therefore stopped prior to printing the marks on the disc, the disc (without the printed marks) could still be inserted into a DVD reader and at least the control logic could be read and executed by the reader. The content data and control key data could also be read if permitted by the executed control logic or prevented from being read by the executed control logic (in the absence of the printed marks). Since the marks are printed on the disc only after, for example, a conventional disc manufacturing process has been completed, a specialized machine/process is not needed to construct the disc prior to printing, thereby limiting manufacturing costs. Alternatively, a specialized machine/process which integrates disposition of the marks with the manufacture of, for example, the storage layer may be utilized.

FIG. 5 illustrates an exaggerated schematic cross-sectional view of the disc of FIG. 4A including an exaggerated schematic cross-sectional view from section line 5-5 of the disc illustrated in FIG. 4A including a cross-sectional view of storage layer 105a which stores a first control key 202 (in one or more turns) and a second control key 212 (in a different one or more turns). The first control key 202 and/or the second control key 212 are used with marks 200a-210c, 210a-210c in conjunction with control logic data also stored on the disc to controllably allow or prevent their reading as a function of the playback of content data 220, and hence to control playback of content data 220. The content data 220 constitutes, for example, digital MPEG-2 data that can be played back as a "movie" or "video". While the content data that can be played as a movie or video may be prevented from being further read by the DVD after predetermined reading and playback usage(s) (as will be discussed in more detail below), other data (i.e., non-protected data) such as data played back as an advertisement can be played back even after the predetermined and playback usage of the protected content data is prevented.

Each control key 202, 212 is stored in a specific area of the storage layer 105a. Specifically, control keys 202, 212 may be stored in a video object (VOB) file of the DVD rather than an information (IFO) file because DVD readers are more tolerant of sector read errors in a VOB files than in IFO files.

The control logic stored on the DVD and provided at least in part to the reader may be one or more of the following types: (i) clear key data logic, (ii) hidden key data logic or (iii) change key data logic. If clear key data control logic is stored and a control key is read correctly by a DVD reader, then reading and playback of the content data 220 is enabled via the clear key data control logic. If, however, an expected control key cannot be read correctly (i.e., because its associated mark has become opaque), then further reading and playback of at least some of the content data 220 (i.e., the protected content data) can be prevented via the clear key data control logic. If hidden key data control logic is stored and a control key cannot be read correctly by a DVD reader, then reading and playback of at least some of the content data 220 can be enabled via the hidden key data control logic. If, however, an expected control key is read correctly (i.e., because its associated mark has become transparent), then further reading and playback of content data can be prevented via the hidden key data control logic. If change key data control logic is stored on the DVD and successive reads of a control key by a DVD reader yield the same result, then reading and playback of at least some of the content data 220 can be prevented via the change key data logic. If, however, successive reads of a control key by a DVD reader yield different results (i.e., because a portion or all of its associated mark has changed in optical properties), then reading and playback of content data 220 can be enabled via the change key data control logic.

As illustrated in FIGS. 4A, 4B and 5, at least one of the marks 200a-210c, 210a-210c of photosensitive dye is printed on the outer surface of the disc in registration with and over the area of storage layer 105a that stores control keys 202, 212. In a preferred embodiment for example, at least one of the first set of marks 200a-210c is printed on the disc position located over the storage area for at least one instance of first control key 202 and at least one of the second set of marks 210a-210c is printed on the disc at a position located over the storage area for at least one instance of second control key 212. By printing at least one mark of a specific type of dye (i.e., one that changes from clear to opaque or one that changes from opaque to clear) over at least a portion of at least one instance of a recorded control key data structure, any conventional DVD reader (through properly associated control logic provided at least in part from the DVD), further reading and playback of content data 220 may be prevented after a predetermined amount of substantially unrestricted reading and playback usage.

One exemplary embodiment of a DVD includes marks that change from clear to opaque printed over at least a portion of at least one instance of a control key and stores clear key data control logic which is read by the DVD reader. In this embodiment, when the DVD is first inserted into a DVD reader, marks 200a-210c, 210a-210c are clear or transparent. Since marks 200a-210c are transparent, the DVD reader will successfully read the value of the first control key 202 through transparent marks 200a-210c. Successful reading of this first control key will enable the DVD reader to read and play content data 220 via the clear key data control logic read by the DVD reader. Content data 220 can be re-read and re-played any number of times until the first use of the DVD ends upon the user ejecting the DVD from the DVD reader, pressing a stop button on the DVD reader to stop play of the DVD or turning off power to the DVD reader (as will be discussed in more detail below).

Immediately after successful reading of the first key, but before reading of content data 220, the photosensitive dye forming marks 200a-210c is repeatedly exposed to laser light from the DVD reader to permanently change these marks from clear to opaque. After marks 200a-210c have been changed to opaque, the DVD reader will no longer be able to correctly read an instance of the first control key. The opacity of marks 200a-210c prevents the DVD reader laser light from being successfully transmitted to and received from the first control key data bumps. While marks 200a-

210c are changed to opaque during a first use of the disc, marks 210a-210c disposed over instances of second control key 212 remain transparent.

If instances of the first control key are the only control key data stored on a disc, further reading and play of content data 220 after the end of the disc's first use would be prevented by the clear key data control logic since no instance of a first control key can be successfully read through the now opaque marks 200a-210c. If, however, a second control key 212 is stored on the disc, DVD reader laser light will be re-directed to the radius where instances of a second control key are stored after unsuccessful attempts to read the first control key. Since marks 210a-210c are still transparent, the value of the second control key can be successfully read. Successful reading of the second control key data then enables the DVD reader to read and play content data 220 any number of times via the clear key data logic until such second use of the disc ends upon the user ejecting the disc from the DVD reader, pressing a stop button on the DVD reader to stop play of the DVD or turning off power to the DVD reader.

Immediately after successful reading of one or more instances of the second control key but before the reading of content data 220 (during a second attempted use of the DVD), photosensitive dye forming marks 210a-210c is repeatedly exposed to DVD reader laser light to permanently change it from transparent to opaque. After marks 210a-210c have become opaque, the DVD reader will no longer be able to correctly read an instance of the second control key. Of course the DVD reader also still is not able to correctly read an instance of the first control key due to opacity of marks 200a-210c. The opacity of marks 210a-210c prevents DVD reader laser light from being successfully transmitted to and received from the second control key data bumps.

Further reading and play of content data 220 is prohibited after a second use is completed since no instance of the first control key now can be successfully read through opaque marks 200a-210c and no instance of the second control key can be read through opaque marks 210a-210c. The disc of this exemplary embodiment thus provides two unfettered reading and playback uses before preventing content data 220 from being further read.

Another exemplary embodiment of a DVD includes marks that change from opaque to transparent being printed on the outer surface of the disc and disposed over at least a portion of at least one instance of a control key and stores hidden key data control logic which is read by the DVD reader. For clarity, reference numbers for marks 200a-210c, 210a-210c and control keys 202, 212 have been maintained in discussion of this embodiment, although it will be appreciated that at least the marks in this embodiment differ from the marks used in the previous embodiments discussed immediately above.

In this later exemplary embodiment, when the disc is first inserted into a DVD reader, marks 200a-210c, 210a-210c of photosensitive dye are opaque. Because marks 200a-210c are opaque, the DVD reader will not be able to correctly read the value of an instance of the first control key 202. The opacity of marks 200a-210c will prevent DVD reader laser light from being successfully transmitted to and received from any instance of the first control key (or at least some instances thereof). Since the first control key cannot be read correctly, reading and playback of the content data 220 is enabled via the hidden key data control logic read by the DVD reader. Content data 220 then can be re-read and re-played any number of times until a first unfettered use of the disc ends (e.g., upon the user ejecting the disc from the DVD reader, pressing a stop button on the DVD reader to stop play of the DVD or turning off power to the DVD reader).

Immediately after unsuccessful reading of at least one instance of the first control key, but before reading of content data 220, photosensitive dye forming marks 200a-210c is repeatedly exposed to infrared laser light from the DVD reader to permanently change this dye from opaque to transparent. After marks 200a-210c have been changed to become transparent, the DVD reader will correctly read the value of at least one instance of the control key through marks 200a-210c. While marks 200a-210c are changed to become transparent during a first use of the disc, marks 210a-210c disposed over a second control key 212 are still opaque.

If the first control key is the only control key stored on the disc, further reading and play of content data 220 (after the end of the disc's first unfettered use) would be prevented via the hidden key data control logic since at least one instance of the first control key 202 now can be successfully read through now transparent marks 200a-210c. If, however, a second control key 212 is stored on the disc, laser light from the DVD reader will be re-directed to the radius at which at least one instance of a second control key is stored (after the successful reading of the first control key 202). Since marks 210a-210c are still opaque, the value of the second control key cannot be successfully read. Opacity of marks 210a-210c still prevents laser light from successfully reading the second control key. Such unsuccessful reading of the second control key now will again enable the DVD reader to read and play content data 220 any number of times until the second use of the disc ends (e.g., upon the user ejecting the disc, pressing a stop button, or turning off power to the DVD reader).

Immediately after unsuccessful reading of the second control key but before reading of content data 220 during such attempted second use of the DVD, photosensitive dye forming marks 210a-210c is repeatedly exposed to infrared laser light from the DVD reader to permanently change the photosensitive dye from opaque to transparent. After marks 210a-210c have been changed to become transparent, the DVD reader will be able to correctly read at least one instance of the second control key through marks 210a-210c. Of course the DVD reader will still be able to successfully read the first hidden key 202 due to the now transparent marks 200a-210c.

Further reading and play of content data 220 is prevented after the second unfettered use is completed via the hidden key data control logic since the first hidden key 202 now can be read through transparent marks 200a-210c and the second control key 212 also now can be read through transparent marks 210a-210c. The disc of this exemplary embodiment thus provides two unfettered reading and playback uses before preventing content data 220 from being further read. Of course, the disc can be modified (as illustrated, for example, in FIG. 7) to include additional control keys and corresponding marks to provide more than two unfettered reading a playback uses before preventing the content data from being further read.

Another exemplary embodiment of the DVD stores change key data control logic and includes marks that change from opaque to transparent printed on the DVD in registration over at least a portion of storage areas storing at least one instance of a control key. For clarity, reference numbers for marks 200a-210c, 210a-210c and control keys 202, 212 have been maintained in the discussion of this further embodiment. However, it will be appreciated that the operation provided by the marks, control key(s) and control logic discussed in this embodiment differ from in the previous embodiments implementing clear key data control logic and hidden key data control logic.

In this later embodiment, when a DVD is first inserted into the DVD reader, marks 200a-210c, 210a-210c are opaque. Because marks 200a-210c are opaque, the DVD reader will not be able to correctly read the value of an instance of the first control key 202. Opacity of marks 200a-210c prevents DVD reader laser light from successfully being transmitted to and received from any instance of the first control key. Immediately after unsuccessful reading of the first control key, photosensitive dye forming marks 200a-210c is repeatedly exposed to infrared laser light from the DVD reader to permanently change the dye from opaque to transparent. After marks 200a-210c have been changed to transparent, the DVD reader will again be instructed to read the first control key. This time the DVD reader will successfully read at least one instance of the first control key because marks 200a-210c are now clear. Since the DVD reader will thus have yielded different values for successive reads of the first control key, the reading and hence play of the content data 220 again will be enabled via the change key data control logic read by the DVD read from the DVD. The content data 220 can be re-read and re-played any number of times until the first unfettered use of the disc ends (e.g., upon the user ejecting the disc, pressing a stop button or turning off power to the DVD reader).

At the beginning of the second attempted disc use, marks 200a-210c have already been permanently changed to become transparent. Successive reads of the first control key now will yield the same value since laser light from the DVD reader will be successfully transmitted through now transparent marks 200a-210c during both read attempts.

If the first control key is the only control key stored on the disc, further reading and play of content data 220 may be prevented after completion of the first unfettered use since successive readings of the first control key now would yield the same result. If, however, a second control key 212 is stored on the disc, the DVD reader laser light will be re-directed to the radius at which at least one instance of a second control key is stored (after successive readings of the first control key 202 yield the same result). Since marks 210a-210c printed over at least one instance of the second control key are now opaque, the value of the second control key cannot be successfully read. The opacity of marks 210a-210c prevents laser light from successfully reading the second control key.

Immediately after such unsuccessful reading of the second control key 212, photosensitive dye forming the marks 210a-210c is repeatedly exposed to infrared laser light from the DVD reader to permanently change it from opaque to transparent. After marks 210a-210c have been changed to transparent, the DVD reader will again be instructed to attempt reading the second control key. This time the DVD reader will successfully be able to read the second control key because marks 210a-210c are now transparent. Since the DVD reader will thus have yielded different values during successive attempted reads of instances of the second control key, reading and hence play of content data 220 will be enabled via the change key data control logic. Content data 220 can be re-read and re-played any number of times until the second unfettered use of the disc ends (e.g., upon the user ejecting the disc, pressing a stop button or turning off power to the DVD reader).

At the beginning of the attempted next use of the disc, marks 200a-210c, 210a-210c have already been permanently changed to become transparent. Successive readings of the first control key and of the second control key will both now respectively yield the same first key values and the same second key values. Since values yielded for successive readings of control keys 202, 212 through marks 200a-210c, 210a-210c now are the same, further reading and hence playback of content data 220 can be prohibited via the change key data control logic. The disc of this exemplary embodiment thus provides two unfettered reading and playback uses before preventing content data 220 from being further read.

As those skilled in the art will appreciate, different selections of the type of dye forming marks 200a-210c, 210a-210c and different types of control key data 202, 212 can be implemented to produce a form of counting logic (in conjunction with appropriate reading and control logic software and/or hardware) and thus prevent further reading of content data 220 after a predetermined number or amount of substantially unrestricted reading and playback usages of content data 220. For example, marks formed by a dye that changes from transparent to opaque printed over at least a portion of at least one instance of the "change" key (i.e., a control key that operates in conjunction with change key data control logic stored by the DVD) may initially allow successful reading of the value of the change key through initially clear marks. As the dye is exposed to the reading laser, it will permanently change from transparent to opaque so that the DVD reader thereafter yields different (i.e., changed) values for each of the first two successive attempted reading cycles, thereby enabling the reading of content data 220. After the dye change occurs, however, subsequent repeated attempts to read the control key data will only yield in the same values since the marks now are permanently opaque. Of course, reading and playback of content data 220 may be prohibited or determined by yet another control key. Furthermore, it is possible to construct a DVD in accordance with the present invention that implements marks including a dye which changes upon exposure to a reading laser from opaque to transparent printed over at least one portion of at least one instance of a "clear" key (i.e., a control key that operates in conjunction with clear key data control logic stored by the DVD), or marks including a dye which changes from transparent to opaque printed over at least a portion of at least one instance of a "hidden" key (i.e., a control key that operates in conjunction with hidden key data control logic stored by the DVD). These last two embodiments may, of course, require change in control logic programmed into the DVD and specification.

A DVD having marks including an initially opaque dye offers some possible advantages over discs with marks including an initially transparent dye. For example, a control key programmed into (i.e., stored in) the disc can be configured to prevent reading and play of content data in the absence of interfering opaque marks. The content data of pirated discs, whether produced by exact pit for pit copying of the master or by theft of fresh replicates, will be unreadable via the unobstructed reading of the control key (e.g., hidden key). Furthermore, if the marks of an initially opaque dye are removed by a disc polisher, the removal of such marks also would render content data unreadable since the hidden key now would be readable upon a first attempted use.

Since a change key only enables reading and play of content data when successive readings yield different results, a change key is capable of preventing a potential hacker from disabling the limited use mechanism by printing a permanently opaque mark over the control key. That is, one of the ways that a limited use mechanism provided by a hidden key can be successfully disabled is to place a permanent opaque mark over the hidden key. However, providing a permanently opaque mark over a change key would not successfully disable the limited use mechanism of the disc since attempted readings of the change key would only yield the same values.

As discussed above, at least one of the marks is printed on the disc at a position over at least a portion of at least one instance of a control key to ultimately prevent further reading and play usage of content data. As illustrated in FIG. 4B, in order to increase the chances that one of the marks 200a-210c, 210a-210c is respectively printed over at least a portion of the control keys 202, 212, each of the control keys 202, 212 is preferably formed by a plurality of parts (e.g., 50 parts)—or simply repeated a plurality of instances. The parts of each control key 202, 212 (represented generally by arc-like spots stored in the spiral turns storing a control key in FIG. 4B) are preferably distributed over consecutive turns of a storage layer (e.g., 400 consecutive spiral turns). While it is possible in the present invention to position all parts of the control key 202, 212 in a single spiral turn, distributing the parts (or instances) over multiple spiral turns enhances the probability that at least one of the marks is correctly printed in registry over one part (or instance) of the control key and decreases required precision in positioning the mark during printing processes. It will be appreciated that control keys 202, 212 may require a smaller amount of data (e.g., 10 megabytes) and thus be contained within a smaller number of spiral turns (e.g., approximately 80 spiral turns).

As long as at least one of the marks is properly printed over at least one of the parts (or instances) of the control key, use of the DVD can be successfully limited. For example, control logic associated with implementation of a clear key may require that every part (or instance) of the clear key have to be read correctly for content data 220 to be read and played. If marks comprising "transparent to opaque" dye are printed on the disc, as long as one of the marks is printed over one of the parts (or instances) of the clear key, content data 220 will be prevented from being further read and played once that at least one mark changes from transparent to opaque. Use of content data 220 would therefore be properly limited even if none of the other marks are printed over a part (or instance) of the control key.

As another example of how only one mark needs to be printed over a part of the control key in order to limit use of the disc, the control logic associated with a change key requires that all parts (or instances) of a change key must provide the same result in successive readings if reading and play of the content data 220 is to be prevented. If one mark is properly positioned over a single part of the change key, the covered part (or instance) of the change key will yield different values in successive readings before and after the mark is permanently changed from opaque to transparent or from transparent to opaque. After either such permanent change, successive readings will thereafter yield the same result. Accordingly, even if no other part (or instance) of the change key is covered by one of the marks, use of the DVD may be limited.

With respect to an embodiment using a hidden key as the control key, if only one part (or instance) of the hidden key cannot be read, content data 220 can be read and played. As in embodiments including a clear key or change key, only one part (or instance) of the hidden key needs to be positioned underneath a mark to prevent further reading and playback of content data.

Determining the radius of a center spiral turn of a group of consecutive spiral turns storing a control key in accordance with the present invention is described below. Determining the radius of the center spiral turn will determine the distance from the center of the disc at which marks are to be printed. By printing marks at a position over the center of the spiral turns storing the control key, the probability of printing at least one of the marks over at least one part (or instance) of the control key is maximized. While the discussion below discusses exemplary calculations for a DVD-5 disc, it will be appreciated that similar calculations can be performed for other disc formats (e.g., DVD-9, DVD-10, DVD-14 and DVD-18).

The storage capacity of a DVD-5 disc is 4,699,979,776 bytes (each byte having 8 bits). Since there are 2048 bytes in a sector, the storage capacity of the DVD-5 disc is 2,294,912 sectors (4,699,979,776 bytes/2048 bytes per sector). The data area 105a of the storage layer, which has an inner radius of 24.0 mm and an outer radius of 58.0 mm, is 8759 mm$^2$ ($\pi(58)^2-\pi(24)^2$). Since the width of the track is 0.74 microns, the total track length is 11,836,986 mm (8759 mm$^2$/0.74 microns). The length of a single sector is thus 5.16 mm (total track length/total number of sectors=11,836,986 mm/2,294,912 sectors). Accordingly, the length of a sector is 5.16 mm and the width of the sector is 0.74 microns, and therefore the area of a sector is 3,820 $\mu$m$^2$ (5.16 mm*0.74 microns).

To determine the precise radius of a sector of the track storing a control key and hence to determine the desired printed position of marks from the center of the disc, the following steps may be performed:

1. Calculate the total data area required to reach the center of the sector for storing the control key (Area=number of sectors×3820 $\mu$m$^2$);
2. Calculate adjusted area in view of the unused inner area of 1809 mm$^2$ (adjusted area=area+1809 mm$^2$); and
3. Determine the radius of the sector (radius=(adjusted area/$\pi$)$^{1/2}$).

For example, calculation of the precise radius of the center spiral turn having data sectors storing a first control key 202 can be performed using the steps (1)-(3) as shown below:

First, a determination is made that there are 97,300,000 bytes to the center of the first control key 202. This translates to 47,509 sectors (97,300,000 bytes/2048 bytes per sector). Using step 1 above, the total data area required to reach the center of the sector equals 181.41 mm$^2$ (47,509×3820 mm$^2$). This area is then adjusted to account for the unused inner area. That is, using step 2 above, the adjusted area equals 1990.41 mm$^2$ (181.41 mm$^2$+1809 mm$^2$). Using step 3 above, the radius of the center spiral storing the control key 202 is equal to 25.17 mm ((1990.41 mm$^2$/$\pi$)$^{1/2}$). The marks 200a-210c can be thus arranged at this radius $R_1$ to insure that at least one of the marks 200a-210c is printed over at least one of the parts (or instances) of control key 202.

The radius $R_2$ at which marks 210a-210c are to be printed can be calculated in a similar manner using steps (1)-(3) above. As illustrated in FIG. 4A, a plurality of marks 200a-210c are spaced around the DVD at the radius $R_1$ to improve the probability that at least one mark is printed over at least one part (or instance) of control key 202.

The marks are preferably printed as an arc with a length approximately equal to half the length of the sector to more certainly overcome the built-in error correction capability of the disc. As illustrated in FIG. 5, the marks should be large enough to cover all of the spiral turns that are used to create the control key and centered over the center spiral turn storing the control key.

Referring again to FIGS. 4B and 5, each of control keys 202, 212 may be surrounded by padding data. Specifically, the storage area storing first control key 202 is arranged between storage areas for respectively storing padding data 204, 206, and the storage area for storing second control key 212 is arranged between storage areas for respectively storing padding data 214 and 216. The storage areas for padding data 204, 206 help insure that marks 200a-210c are not printed over an unintended area such as the storage area for content data 220. Similarly, the storage areas for padding data 214, 216 help insure that marks 210a-210c printed over the second control key 212 are not printed over an unintended area such as the storage area for content data 220. The storage areas for padding data 204, 206, 214, 216 also help insure that control keys 202, 212 are stored near the middle of a VOB (Video Object) file. Padding data 204, 206, 214, 216 may each include, for example, 50 megabytes of non-used padding data (or equivalent blank space), and thus requires approximately 400 spiral turns of the track. It will be appreciated that the amount of data forming each of padding data 204, 206, 214, 216 can be increased or decreased and thus require more or less spiral turns of the track. If the amount of padding data and hence number of spiral turns required to store the padding data is reduced (for example, to 20 turns) then more memory space on the disc is available for other data such as content data.

As can be seen in FIG. 5, the storage area for first control key 202 and the storage area for second control key 212 are physically separated from each other. The storage area for first control key 202 is arranged near the inside edge of the storage layer and the storage area for second control key 212 is positioned near the outside edge of the storage layer. This physical separation will help prevent control keys 202, 212 and/or their respective marks from possibly overlapping with each other.

A DVD according to the present invention may be a random access disc, meaning that control logic instructions encoded on the disc can direct the DVD reader laser to any physical portion of the disc itself. A short time delay (e.g., a half second) results when the laser from the DVD reader repositions and refocuses itself from an inner edge of the disc such as at $R_1$ to a position on the outside edge of the disc such as at radius $R_2$. To avoid delays resulting from the laser having to reposition and refocus itself on another spiral turn of the track when content data 220 is being read and played, content data 220 is preferably stored in a group of consecutive spiral turns. It is thus preferable in many instances, to avoid placing the storage areas for control keys 202, 212 in a position that interrupts the area storing content data 220. The storage areas for the control keys 202, 212 are therefore typically positioned on either side of the storage area for content data 220 so that when content data 220 is being read and played, the laser does not have to reposition and refocus itself when skipping over an intervening control key.

A conventional DVD video specification, developed by the DVD forum, defines a complex and full-featured method of publishing multimedia content on a DVD. According to the DVD specification, general program registers (GRPM) and navigation commands are defined in conventional DVD readers. The navigation commands defined by the DVD video specification are used by a DVD developer to control reading and playback of content data stored on the DVD through logic control commands (i.e., control software) stored in the pre-, post-, cell and button command areas. The general parameter registers can be considered to form memory locations in the computer of the DVD reader, and the navigation commands can be considered to form instructions in the computer of the DVD reader. General parameter registers and navigation commands may be used by the computer of the DVD reader to control playback. In exemplary embodiments of the present invention for example, general parameter registers and navigation commands are used, inter alia, to ensure that control keys 202, 212 positioned at specific portions of the DVD are read (or at least attempted to be read as permitted or not by the optical property of associated marks) to thereby allow or prevent reading and playback at least some of content data 220.

According to a conventional DVD video specification, the general program registers of the DVD reader are all cleared (i.e., set to a value equal to zero), when any of the following occurs: (i) the disc is ejected from the reader, (ii) a stop key on the DVD reader is pressed to stop the play of the DVD, or (iii) the power to the DVD reader is turned off. Any of these actions (i)-(iii) may be relied upon to determine when a "use" has been completed. That is, one use of a disc may be considered not to end until the user ejects the disc, presses the stop key or turns the DVD reader off. The user of the disc can thus re-read and re-play content data any number of times during a single such-defined use of the disc until one of actions (i)-(iii) occurs. As discussed above, a preferred embodiment permits multiple (e.g., two) uses of the disc before content data is prevented from being read and played. Of course other definitions of one unfettered use could also or alternatively be utilized by the limited use control logic of this invention.

In an alternative embodiment, the DVD may have control logic instructions stored on it that may essentially disable the stop key. If the stop key on the DVD reader is pressed by the user in this alternative embodiment, the stop key will not have any effect on reading play of content data of the disc. A single "use" of the disc then will end when the disc is ejected or the DVD reader turned off. This alternative embodiment has the possible advantage that it may prevent users who inadvertently hit the stop button from losing one of the permitted uses of the disc. A single "use" in this alternative embodiment is defined by a constantly seated disc with the DVD reader turned "on" at all times. When the constant seating of the disc ends upon ejection of the disc, or when the reader is turned off, one unfettered use is completed. During one such use of the DVD, the user may read and play the content data a multiple number of times. For example, the user may watch a movie from reading content data an infinite number of times, as long as the disc is not ejected or the power to the DVD reader is not turned off. After the user re-inserts the DVD back into the DVD reader or turns the power to the DVD reader back on, another use will begin. As in the previous use instance, the user can read and play content data a multiple number of times during the second use.

Figure 8A:
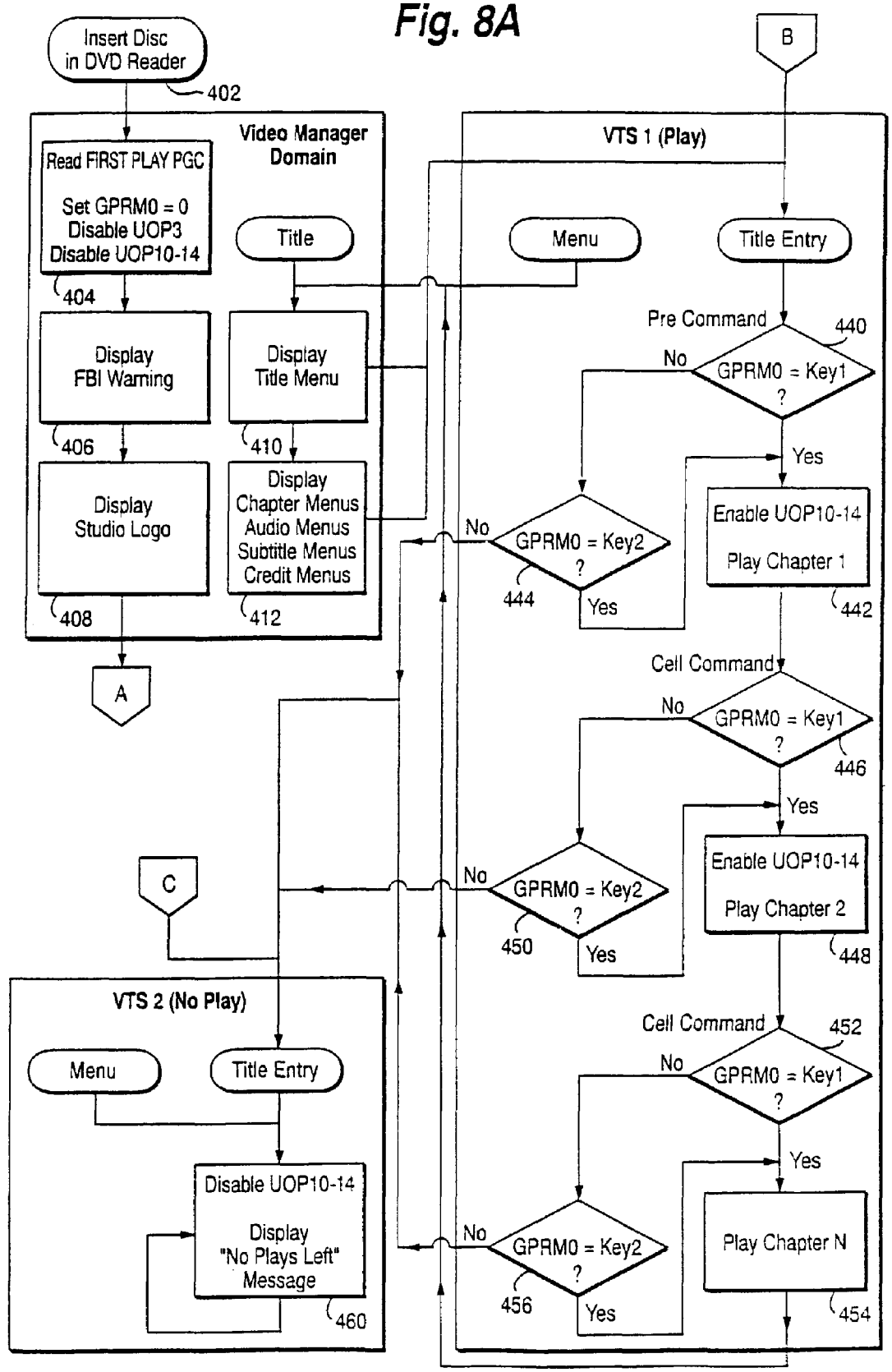
FIGS. 8A-8B are flow diagrams illustrating the use of an exemplary embodiment of a DVD of the present invention.
Figure 8B:
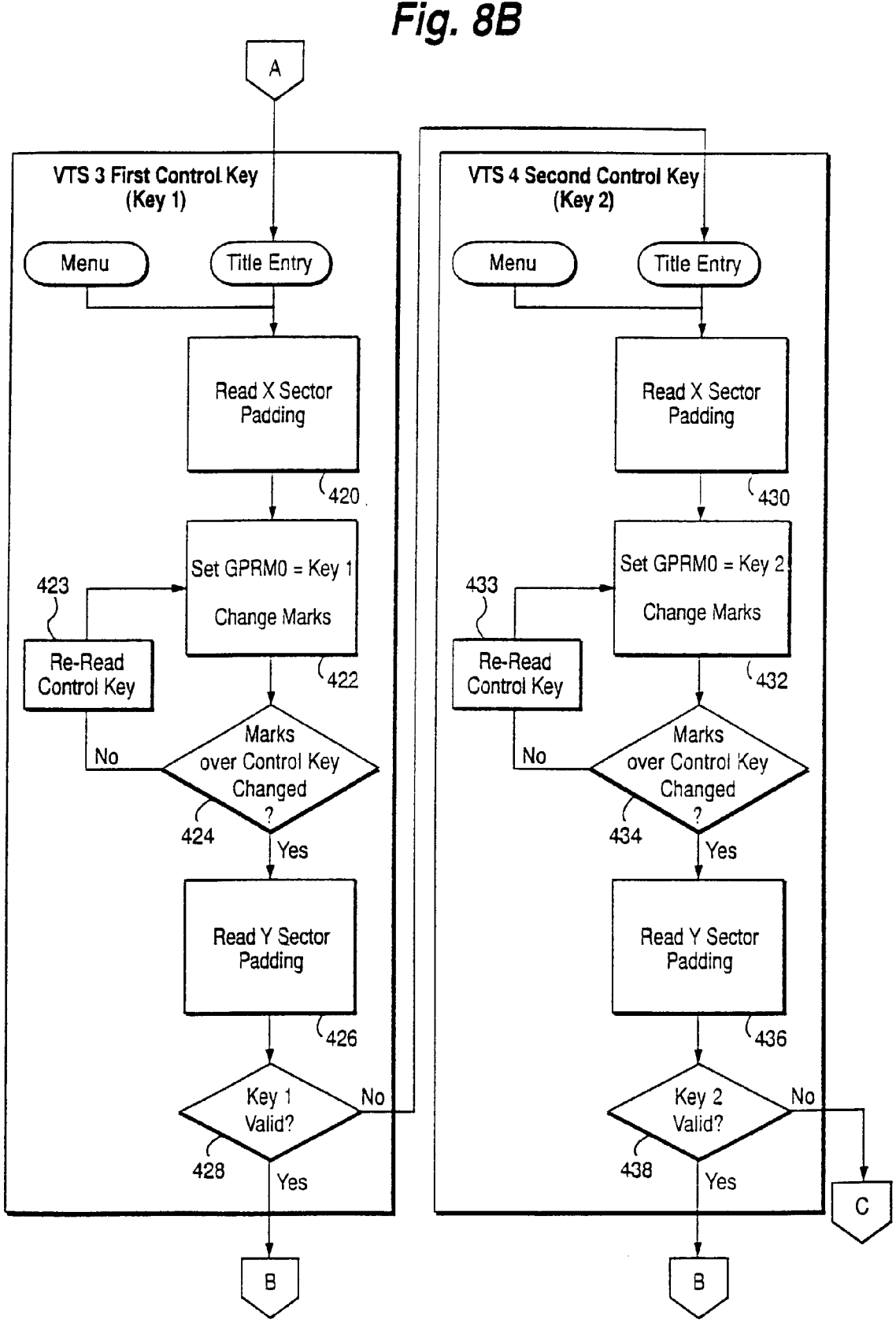

FIGS. 8A-8B depict exemplary control logic software to be included in a limited use DVD and executed in a DVD reader that has received an exemplary disc as illustrated in FIGS. 4A-4B and 5, in which marks 200a-210c, 210a-210c include a photosensitive dye that changes from trasnparent to opaque and control keys 202, 212 are formed by respective clear keys. Since the disc illustrated in FIGS. 4A-4B and 5 includes two control keys 202, 212, two "uses" of the disc are allowed before content data 220 is prevented from being read and played.

The exemplary DVD stores a first play PGC command. The first play PGC command is defined in the DVD video specification and forms the sector of the DVD that every DVD reader first reads to obtain its software "booting" instructions. After the disc is inserted into the DVD reader (step 402), the first play PGC command will be read by the DVD reader and the user options UOP 3 and UOP 10-14 are disabled (step 404). Reading the first play PGC enables general parameter register no. 0 GPRM0 of sixteen general program registers to be set to a value of zero. Disabling the user options deactivates option buttons pressed by the user. Even if a title button or menu button is pressed, the user will therefore be prevented from bypassing attempted reading of one or more of control keys 202, 212. Disabling user options will also prevent the user from bypassing display of the FBI warning (step 406) and the studio logo (step 408).

After the studio logo is displayed, the DVD reader will attempt to read first control key 202. The reading of the first control key 202 is depicted in detail by subprocess "A" in FIG. 8B. The padding data 206 (the "X sector padding") is first read to ensure that the starting sector of the VOB can be read correctly (step 420).

The first control key 202, formed in this exemplary embodiment by a first clear key, is read through the initially clear marks 200a-210c. The register GPRM0 of the DVD reader is set to a value Key 1 as a result of the clear key being read by the DVD reader (step 422). After the value of register GPRM0 has been set to Key1, the clear key is repeatedly read until the marks 200a-210c change in optical property from clear to opaque.

The storage areas storing first clear key are thereby permanently obscured from being read by the now opaque marks 200a-210c. If marks 200a-210c printed over the first clear key have not yet changed to become opaque after a particular number of reading cycles ("no" in step 424), the DVD reader will continue to re-read the first clear key (step 423) until marks 200a-210c printed over the first clear key have changed to become opaque (or until a further maximum number of read cycles have been effected). If the marks 200a-210c printed over the first clear key have changed ("yes" in step 424), the padding data 204 (the "Y sector padding") is read (step 426). Reading the padding data 204 ensures that the end sector of the VOB can be read correctly.

A determination is then made regarding whether Key1 is valid (step 428). That is, a determination is made regarding whether register GPRM0 has been set to a value Key1 via successful reading of the clear key through marks 200a-210c. Since register GPRM0 has been set to a value Key1, Key1 is valid ("yes" in step 428) and the reading and play of content data 220 as part of a first use of the disc is enabled as illustrated in the subprocess labeled "B" in FIG. 8A. The user can press the title or menu buttons at any time during the play of the content data 220 to access appropriate menus. Pressing the title or menu buttons to access the menus will not cause the first use of the disc to end.

During play of the DVD, the DVD reader checks the value of the register GPRM0 at the start of each chapter of the content data 220 to prevent users from jumping directly to a specific title and chapter using the DVD controller. If the register GPRM0 has a value equal to Key1, the user options UOP 10-14 will be enabled and play of the first chapter of content data 220 is permitted (step 442). User operations for the menu, title, etc. buttons will thus be enabled. If the GPRM0 is not equal to Key1 then the DVD reader will then determine whether register GPRM0 has a value equal to Key2 (step 444). If register GPRM0 is not equal to either Key1 or Key2 a "No plays left" message will be displayed (step 460) in the subprocess labeled "C".

Since register GPRM0 at this time has a value equal to Key1 ("yes" in step 440), chapter 1 will be played (step 442). A test to determine whether register GPRM0 is equal to the value Key1 or Key2 is repeatedly performed before the start of each chapter (steps 446, 450, 452, 456). Since the value of register GPRM0 is equal to Key1 at this time ("yes" in steps 446 and 452), the corresponding chapters 2, N of content data 220 may be read and played (steps 448 and 454).

After the last chapter N of content data has been played, (i.e., after step 454) the DVD player will display the title menu and the chapter, audio, subtitle and credits menu (steps 410, 412). The user will thus be able to read and play content data 220 as many times as desired until the DVD is ejected, the stop button is pressed or the power to the DVD reader turned off. As discussed above, ending the use of the DVD may be otherwise defined. For example, a use may end only in response to ejecting the disc or turning the power of the DVD reader off. When the first use of the disc ends (by any programmed desired definition), the general program registers, including GPRM0, are all cleared by setting their respective values equal to zero. While marks 200a-210c printed over first control key 202 now have been permanently changed to become opaque, marks 210a-210c printed over second control key 212 remain clear at the time the first use ends.

During the second use of the DVD, steps 404-408 will be performed in the same manner as described above for a first use of the DVD. However, at the beginning of the second use, marks 200a-210c printed over the first clear key have already been permanently changed to opaque so that the first clear key can no longer be read. In step 422 of subprocess "A", the register GPRM0 will therefore not be set to the value of Key1 since the first clear key cannot be read through the marks 200a-210c. In step 428, a determination will thus be made that the value of Key1 is not valid ("no" in step 428). The control logic software instructions embedded on the disc will then direct the laser of the DVD reader to another radius of the disc to attempt reading second control key 212 as depicted in the right-hand portion of FIG. 8B.

The reading of second control key 212 (i.e., a second clear key) involves the same steps as reading of the first control key 202 (i.e., the first clear key). Specifically, padding data 214 is read (step 430). Since marks 210a-210c printed over the second clear key are still transparent, the value of the clear key can be read by the DVD reader through marks 210a-210c. The value of register GPRM0 is thus set equal to Key2 as a result of the DVD reader reading the second clear key. After the value of register GPRM0 is set to Key2, the DVD reader will continue to re-read the second clear key (step 433) until the marks 210a-210c printed over the second clear key have changed to become opaque (or to a maximum failure number of read cycles). If the marks 210a-210c printed over the second clear key have changed ("yes" in step 434), the padding data 216 (the "Y sector padding") is read (step 436).

A determination is then made regarding whether Key2 is valid (step 438). That is, a determination is made regarding whether register GPRM0 has been set to a value Key2 via successful reading of the second clear key through the marks 210a-210c. Since register GPRM0 has been set to a value Key2, Key2 is valid ("yes" in step 438) and the reading and play of content data 220 as part of a second use of the disc is enabled as illustrated in the subprocess labeled "B." Like in the first use, the user can press the title or menu buttons at any time during the reading and play of content data 220 to access appropriate menus. Pressing the title or menu buttons to access the menus will not cause the second use of the disc to end.

As discussed above, the DVD reader checks to determine if register GPRM0 is equal to Key1 or Key2 at the start of each chapter of content data 220 to prevent users from switching directly to a specific title and chapter using a controller of the DVD reader. Since register GPRM0 has a value equal to Key2 at this time ("no" in step 440, but "yes" in step 444), the user operations UOP 10-14 for the menu, title, etc. buttons will be enabled and the first chapter of content data 220 read and played (step 442). The steps of 446-456 will be performed in a similar manner for additional chapters of content data 220. After the last chapter, chapter N, has been read and played, the title menu and the chapter, audio, subtitle and credits menus are displayed (steps 410, 412). The user has the option of reading and playing content data 220 to view the movie as many times as desired until the disc is ejected, the stop button pressed, or the power to the DVD reader turned off.

When the second use of the disc thus ends, the general program registers, including GPRM0, are all cleared by setting their respective values equal to zero. At this time, marks 200a-210c and 210a-210c all have been permanently changed to opaque.

The third time that the user attempts to play the disc, steps 404-408 will be performed in the same manner as in the first two uses of the disc. The DVD reader will then attempt to read the first control key 202. The reader, however, will be unsuccessful in attempting to read the first control key 202 because marks 200a-210c were permanently changed to an opaque state during the first use of the disc. The value of register GPRM0 cannot therefore be set to Key1. A determination will be made that Key1 is not valid ("no" is step 428) and the DVD reader will thus attempt to read second control key 212. The reader, however, again will be unsuccessful in attempting to read second control key 212 because marks 210a-210c were permanently changed to opaque during the second use of the disc. The value of register GPRM0 will thus not be set to Key2 in step 432. A determination will thus ultimately be made that Key2 is not valid ("no" in step 438) and the reader will be directed to read data to display a "No plays left" message (step 460) in subprocess "C". The data encoding the "No plays left" message may also include previews or advertising content to be displayed to the user. The data encoding the "No plays left" will not include, of course, content data 220 (i.e. the "protected" content data) that includes the movie.

While the exemplary control logic embodiment illustrated in FIGS. 8A-8B implement marks comprising of a "transparent to opaque" dye in DVD embodiment is limited to two plays, it will be appreciated that similar control logic may be used to implement marks changing from "opaque to transparent" or a "hidden" key or a "change" key. Furthermore, it will be appreciated that the number of plays can be increased or decreased by increasing or decreasing the number of control keys and the sets of corresponding marks printed over the control keys and/or in making other logic control changes.

While the invention has been described in connection with some exemplary embodiments, it is to be understood that the invention is not to be limited to the disclosed embodiments, but, on the contrary, is intended to cover all variations, modifications and equivalent arrangements now made apparent to those skilled in the art and included within the spirit and scope of any of the appended claims.

What is claimed is:

1. A limited-use digital versatile disc (DVD) comprising:
   a storage layer for storing protected content data and control key data;
   a mark of photosensitive dye disposed in a predetermined relationship to the control key data to allow or prevent successful reading of at least part of the control key data; and
   control logic, also stored in the disc to be executed by a DVD reader and configured in conjunction with said mark and control key data to prevent further reading of protected content data after predetermined reading and playback usage thereof.

2. A DVD as in claim 1 wherein the control logic comprises clear key data logic.

3. A DVD as in claim 1 wherein the control logic comprises hidden key data logic.

4. A DVD as in claim 1 wherein the control logic comprises change key data logic.

5. A DVD as in claim 1 wherein the mark of photosensitive dye changes between transparent and opaque states to respectively allow or prevent successful reading of the control key data.

6. A DVD as in claim 1 wherein the mark of photosensitive dye permanently changes optical properties when exposed to light from a DVD reader laser for at least a predetermined period of time.

7. A DVD as in claim 1 wherein the mark of photosensitive dye is initially transparent to allow successful reading of the control key data but permanently changes from transparent to opaque then preventing successful reading of the control key data.

8. A DVD as in claim 1 wherein the mark of photosensitive dye is initially opaque to prevent successful reading of the control key data but changes from opaque to transparent then allowing successful reading of the control key data.

9. A DVD as in claim 7 wherein the control logic comprises clear key data logic so that when the mark of photosensitive dye is initially transparent, the control key can be read through the mark to enable predetermined reading and playback usage of the protected content data; the mark subsequently permanently changing to become opaque and preventing the control key data from being read and thereby preventing further reading of protected content data.

10. A DVD as in claim 8 wherein the control logic comprises hidden key data logic wherein the mark of photosensitive dye is initially opaque to prevent the control key data from being successfully read thus enabling the predetermined reading and playback usage of the protected content data; and wherein the mark subsequently permanently changes to become transparent so that the control key data can be read thereby preventing further reading of protected content data.

11. A DVD as in claim 4 wherein the mark of photosensitive dye is initially transparent so that a first of the successive reading attempts of the control key data yields a first value based on successful reading of the control key data through the mark, and wherein the mark subsequently permanently changes to become opaque so that a second of the successive reading attempts of the control key data yields a second value based upon unsuccessful reading of the control key data, thereby enabling predetermined reading and playback usage of the protected content data; and successive reads of the control key data thereafter yielding the same second value based upon unsuccessful reading of the control key data to prevent further reading of protected content data.

12. A DVD as in claim 4 wherein the mark of photosensitive dye is initially opaque so that a first of the successive reading attempts of the control key data yields a first value based on unsuccessful reading of the control key data, and wherein the mark subsequently permanently changes to become transparent so that a second of the successive reading attempts of the control key data yields a second value based on successful reading of the control key data, thereby enabling predetermined reading and playback usage of the protected content data; and both of the first and second successive reading attempts of the control key thereafter yielding the same second value based upon successful reading of the control key data through the now transparent mark to prevent further reading of the protected content data.

13. A DVD as in claim 1 wherein the mark is positioned over at least a part of control key data.

14. A DVD as in claim 1 wherein control key data comprises a plurality of parts or instances that are distributed and stored within the storage layer.

15. A DVD as in claim 14 wherein the mark is disposed on the disc over at least one of the parts or instances of the control key data.

16. A DVD as in claim 1 wherein the storage layer stores the protected content data and control key data in separate respective storage areas, and stores a first set of padding data in another storage area which is located between the storage area storing content data and the storage area storing the protected control key data.

17. A DVD as in claim 16 wherein the storage layer stores a second set of padding data in another storage area, the storage area storing protected content data being located between the respective different storage areas storing the first and second sets of padding data.

18. A DVD as in claim 1 wherein:
the storage layer stores second control key data and a second mark of photosensitive dye is disposed on the disc exterior to the storage layer to allow or prevent reading of the second control key data; and
the first-mentioned control key data and the first-mentioned mark and the second control key data and the second mark having respective configurations in conjunction with said control logic to prevent further reading of protected content data after predetermined reading of the protected content data.

19. A DVD as in claim 18 wherein the first-mentioned control key data is stored in a first area of the storage layer, the second control key data is stored in a second area of the storage layer, and the content data is stored in a third area of the storage layer, the third area of the storage layer being located between the first and second areas of the storage area.

20. A DVD as in claim 19 wherein padding data is stored in fourth and fifth areas of the storage layer, the fourth area being located between the first and third areas and the fifth area being located between the second and third areas.

21. A DVD as in claim 20 wherein the first-mentioned mark is positioned over at least a portion of the first and fourth areas but not the third area, and the second mark is positioned over at least a portion of the second and fifth areas but not the third area.

22. A DVD as in claim 18 wherein the first-mentioned mark is positioned over at least a portion of the first-mentioned control key and the second mark is positioned over at least a portion of the second control key.

23. A limited-use digital versatile disc (DVD) comprising:
a storage layer including a track having a plurality of spiral turns, the storage layer storing protected content data within some of the spiral turns and storing control key data within at least one other spiral turn;
at least one mark of photosensitive dye disposed on the disc exterior to the storage layer and disposed over at least a portion the control key data; and
the control key data and the mark of photosensitive dye having a configuration which, together with control logic software also carried in a storage layer of the DVD, prevents further reading of protected content data after predetermined reading and playback usage of the protected content data.

24. A DVD as in claim 23 wherein the control key data comprises multiple parts or instances which are distributed over and stored in a first group of consecutive spiral turns.

25. A DVD as in claim 24 wherein the storage layer stores a first set of padding data in a group of consecutive spiral turns, the group of consecutive spiral turns storing the first set of padding data being located substantially adjacent to the group of consecutive spiral turns storing multiple parts or instances of the control key data.

26. A DVD as in claim 25 wherein the storage layer stores a second set of padding data in another group of consecutive spiral turns, the another group of consecutive spiral turns storing the second set of padding data being located substantially adjacent to the group of consecutive spiral turns storing multiple parts or instances of the control key data and located on a side opposite the group of consecutive spiral turns storing the first set of padding data.

27. A DVD as in claim 23 wherein the storage layer stores a first set of padding data in a group of consecutive spiral turns which are located between the spiral turns storing protected content data and the at least one spiral turn storing the control key data.

28. A DVD as in claim 23 wherein the storage layer stores second control key data within at least one spiral turn that is different from the spiral turns storing protected content data and the at least one spiral turn storing the first mentioned control key data.

29. A DVD as in claim 28 wherein the second control key data comprises multiple parts or instances which are distributed over and stored in a group of consecutive spiral turns.

30. A DVD as in claim 28 wherein the spiral turns of the storage layer storing protected content data are disposed between the at least one spiral turn storing the first mentioned control key data and the at least one spiral turn storing the second control key data.

31. A DVD as in claim 30 wherein the storage layer stores padding data in spiral turns located between (a) the spiral turns storing protected content data and the at least one spiral turn storing the control key data, and (b) the spiral turns storing protected content data and the at least one spiral turn storing the second control key data.

32. A DVD as in claim 23 wherein the storage layer stores data representing one or more additional control keys within one or more respective spiral turns different from the spiral turns storing protected content data and the at least one spiral turn storing the control key data, and the number of said control keys determiners the number of permitted reading and playback uses of protected content data.

33. A DVD as in claim 32 wherein the number of said control keys is equal to the number of permitted reading and playback uses of protected content data.

34. A DVD as in claim 24 wherein the control logic comprises clear key data logic.

35. A DVD as in claim 24 wherein the control logic comprises hidden key data logic.

36. A DVD as in claim 24 wherein the control logic comprises change key data logic.

37. A DVD as in claim 24 wherein the DVD comprises a plurality of marks of photosensitive dye disposed on a surface of the disc exterior to the storage layer, at least one of the marks being positioned over at least one of the parts or instances of the control key data.

38. A DVD as in claim 37 wherein the at least one mark positioned over the at least one part or instance of the control key data is either transparent or opaque to respectively allow or prevent successful reading of the at least one part or instance of the control key data.

39. A DVD as in claim 37 wherein the marks of photosensitive dye permanently change in optical property if exposed to DVD reader laser light for a predetermined cumulative period of time.

40. A DVD as in claim 37 wherein each of the marks is in the shape of an arc or a dot.

41. A DVD as in claim 37 wherein the width of the marks is limited so that no mark is positioned over any portion of the spiral turns storing protected content data.

42. A DVD as in claim 26 wherein the width of the at least one mark is greater than the width of the group of consecutive spiral turns storing the control key data but less than the combined width of the group of consecutive spiral turns storing the control key data and the groups of consecutive spiral turns storing the first and second sets of padding data.

43. A DVD as in claim 23 wherein the mark is initially transparent so that the control key data can initially be read and the mark thereafter permanently changes to become opaque so that the control key data cannot be correctly read.

44. A DVD as in claim 23 wherein the mark is initially opaque so that the control key data cannot correctly be read and the mark thereafter permanently changes to become transparent so that the control key data can be read.

45. A method for limiting use of a DVD, said method comprising:
storing control key data in a storage layer of the DVD;
disposing a mark of photosensitive dye on the DVD exterior to the storage layer, the mark having an initial optical property which allows or prevents at least a portion of the control key data from being read successfully; and
changing the initial optical property of the mark to change the readability of at least a portion of said control key data and logically controlling further reading of protected content data stored in the storage layer as a function of the change in readability after predetermined reading and playback usage of the protected content data.

46. A method as in claim 45 wherein reading the control logic comprises reading clear key data logic.

47. A method as in claim 45 wherein reading the control logic comprises reading hidden key data logic.

48. A method as in claim 45 wherein reading the control logic comprises reading change key data logic.

49. A method in claim 45 wherein the initial optical property of the mark is transparent so that the control key data can be read successfully, and thereafter the optical property of the mark is changed to prevent further reading of at least a portion of the control key data.

50. A method as in claim 45 wherein the initial optical property of the mark is opaque so that at least a portion of the control key data is prevented from being read successfully, and thereafter the optical property of the mark is changed to become transparent so that the control key data can be read successfully.

51. A method as in claim 45 wherein the optical property of the mark is changed from transparent to opaque by reading the control key data using DVD reader laser light one or more consecutive times until the optical property of the mark is changed.

52. A method as in claim 45 wherein the optical property of the mark is changed from opaque to transparent by attempting to read the mark using DVD reader laser light one or more consecutive times until the optical property of the mark is changed.

53. A method as in claim 45 wherein storing the control key data in the storage layer comprises storing a plurality of parts or instances of the control key data in the storage layer, the mark being disposed on the disc over at least a portion of one part or instance of the control key data to initially allow/prevent successful reading thereof and to thereafter prevent/allow successful reading thereof when the mark changes from its initial optical property.

54. A method as in claim 45 further comprising:
storing second control key data in the storage layer and disposing a second mark of photosensitive dye on the DVD exterior to the storage layer,
the second mark having an optical property which initially allows or prevents the second control key data from being read,
wherein the initial optical properties of both the first and second marks can be controllably changed from their respective initial optical properties to prevent further reading of protected content data.

55. A method as in claim 49 further comprising:
disposing a plurality of marks on the disc exterior to the storage layer, at least one of the marks being disposed over at least a portion of control key data, wherein the optical property of the at least one mark disposed over the at least one portion of control key data is changed to prevent further reading of protected content data.

56. A limited-use DVD comprising:
a storage layer storing protected content data and at least one instance of control key data;
at least one mark of photosensitive dye disposed on the DVD exterior to the storage layer;
the at least one instance of control key data and the at least one mark of photosensitive dye having a mutually related spatial configuration which, in conjunction with control logic data also carried by the DVD, prevents further reading of protected content data after a predetermined number of reading and playback use(s) of protected content data, the number of use(s) being determined by the number of different control keys stored in the storage layer.

57. A DVD as in claim 56, wherein the predetermined number of uses is equal to the number of different control keys stored in the storage layer.

58. A DVD as in claim 56, wherein at least one mark of photosensitive dye is positioned over at least a portion of every control key stored in the storage layer.

59. A method for limiting use of a DVD, said method comprising:
storing content data and at least one instance of control key data in a storage layer of the DVD;
disposing at least one mark of photosensitive dye on the DVD exterior to the storage layer; and changing an optical property of the mark, detecting such change and using control logic data also carried by the DVD to prevent further reading of protected content data after a predetermined number reading and playback uses of protected content data;

wherein the protected content data is capable of being read and played an unlimited number of times during a single reading and playback use.

60. A method as in claim 59, wherein a reading and playback use of the protected content data does not end until (i) the DVD is ejected from the DVD reader, (ii) the power to the DVD reader is turned off, or (iii) the play of content data is stopped though a selection of a stop command on the DVD reader.

61. A method for limiting use of a DVD, said method comprising:

storing protected content data and at least one instance of control key data in a storage layer of the DVD;

disposing at least one mark of photosensitive dye on the DVD exterior to the storage layer;

inserting the DVD into a DVD reader;

changing an optical property of the photosensitive mark using DVD reader laser light, detecting and using said detected change in logical control also defined by the DVD content to prevent further reading of protected content data after a predetermined number of reading and playback uses thereof;

wherein a particular reading and playback use of the protected content data does not end until (i) the DVD is ejected from the DVD reader, (ii) the power to the DVD reader is turned off, or (iii) the play of the content data is stopped though a selection of a stop command on the DVD reader.

62. A method of making a limited use digital versatile disc (DVD), the method comprising:

manufacturing a digital versatile disc having a storage layer for storing protected content data, control key data and control logic, the manufacturing being completed to a point so that at least the control logic of the disc is capable of being read and executed by a DVD reader; and disposing, after manufacture of the digital versatile disc to a point so that at least the control logic is capable of being read and executed by a DVD reader, at least one mark of photosensitive dye on the digital versatile disc in a predetermined relationship with the control key data to allow or prevent successful reading of at least part of the control key data.

63. A method as in claim 62, wherein the mark is disposed on the disc by a printing process.

64. A method as in claim 63, wherein the mark is printed on an exterior side of the disc.

65. A DVD as in claim 1, wherein the mark is printed on the disc exterior to the storage layer.

66. A DVD as in claim 23, wherein the mark is printed on the disc exterior to the storage layer.

67. A DVD as in claim 56, wherein the mark is printed on the disc exterior to the storage layer.

68. A method as in claim 45, wherein disposing the mark on the DVD exterior to the storage layer comprises printing the mark on the DVD exterior to the storage layer.

69. A method as in claim 59, wherein disposing the mark on the DVD exterior to the storage layer comprises printing the mark on the DVD exterior to the storage layer.

70. A method as in claim 61, wherein disposing the mark on the DVD exterior to the storage layer comprises printing the mark on the DVD exterior to the storage layer.

* * * * *